United States Patent [19]
Ackeret

[11] 4,259,802
[45] * Apr. 7, 1981

[54] PICTURE VIEWER

[75] Inventor: Peter Ackeret, Küsnacht, Switzerland

[73] Assignee: Licinvest AG, Chur, Switzerland

[ * ] Notice: The portion of the term of this patent subsequent to Jan. 20, 1998, has been disclaimed.

[21] Appl. No.: 943,368

[22] Filed: Sep. 18, 1978

[30] Foreign Application Priority Data

Sep. 20, 1977 [DE] Fed. Rep. of Germany ....... 2742351
Oct. 7, 1977 [DE] Fed. Rep. of Germany ....... 2745214

[51] Int. Cl.³ ............................................. G09F 11/30
[52] U.S. Cl. ........................................ 40/513; 40/490; 40/511
[58] Field of Search ................. 40/513, 511, 509, 508, 40/490, 375, 380, 381

[56] References Cited

U.S. PATENT DOCUMENTS

| | | | |
|---|---|---|---|
| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |

FOREIGN PATENT DOCUMENTS

| | | |
|---|---|---|
| 179675 | 12/1906 | Fed. Rep. of Germany ............ 40/513 |
| 224700 | 7/1910 | Fed. Rep. of Germany ............ 40/513 |
| 864759 | 1/1953 | Fed. Rep. of Germany ............ 40/513 |
| 873908 | 4/1953 | Fed. Rep. of Germany ............ 40/513 |

Primary Examiner—John F. Pitrelli
Attorney, Agent, or Firm—H. Dale Palmatier

[57] ABSTRACT

A picture viewer having an enclosure including a housing or frame and a slider movable in the housing, the frame and slider defining a compartment for a pile of pictures, a separator bar or pile transporter in the enclosure, an individual picture transporter accomplishing loosening of an individual picture from the pile and transporting the individual picture away from the pile, the loosening being accomplished by surface retentive means engaging the face of the individual picture at an end of the pile, such retentive means taking any of a number of different forms including forms which adhere, apply suction, are magnetically or electrostatically attractive, or otherwise retentively related to the face of the individual picture, the surface retentive means, in several forms of the invention, accomplishing the transporting function as well as loosening function, and in other forms of the invention the transporting being accomplished by separate transporting devices.

60 Claims, 110 Drawing Figures

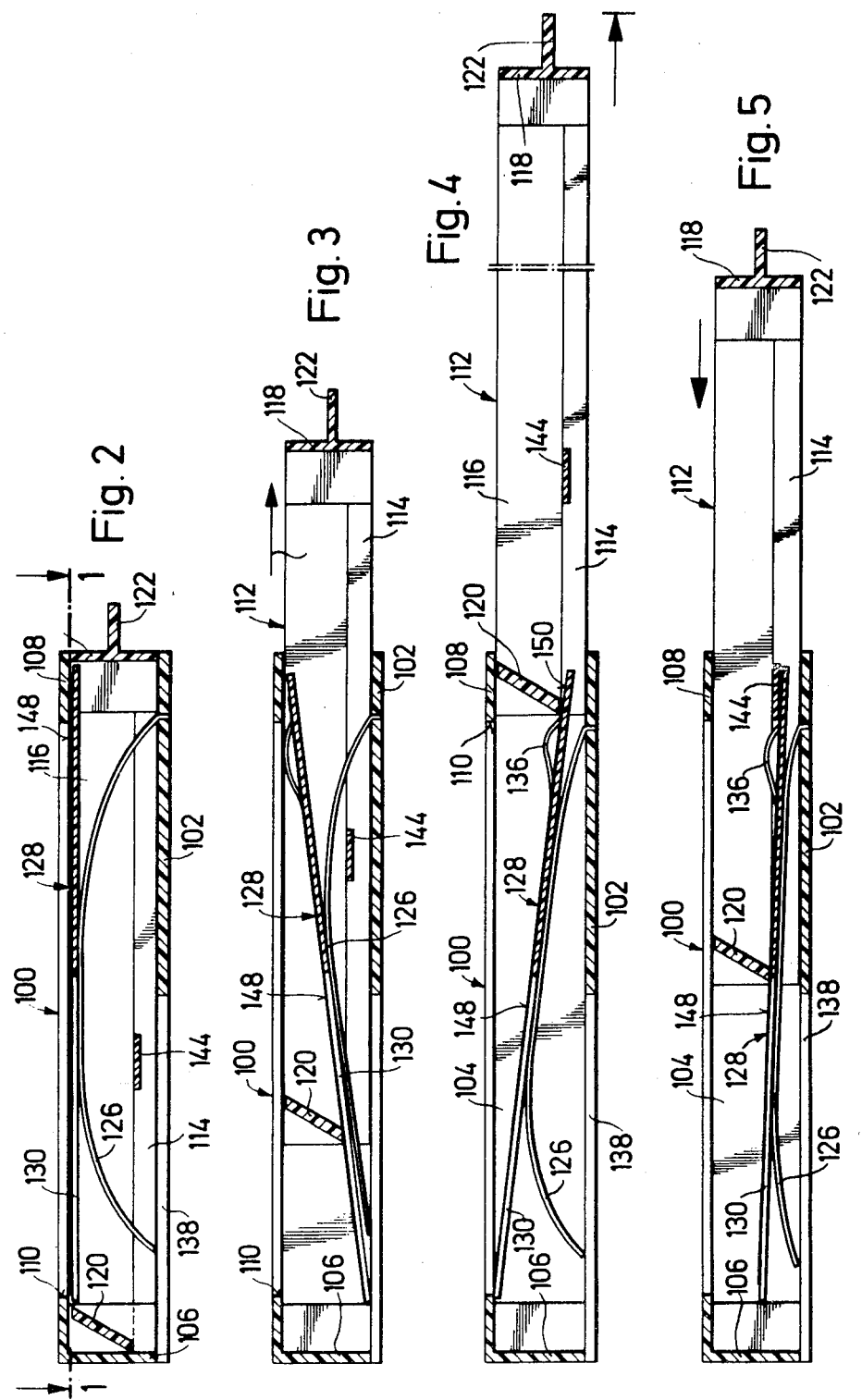

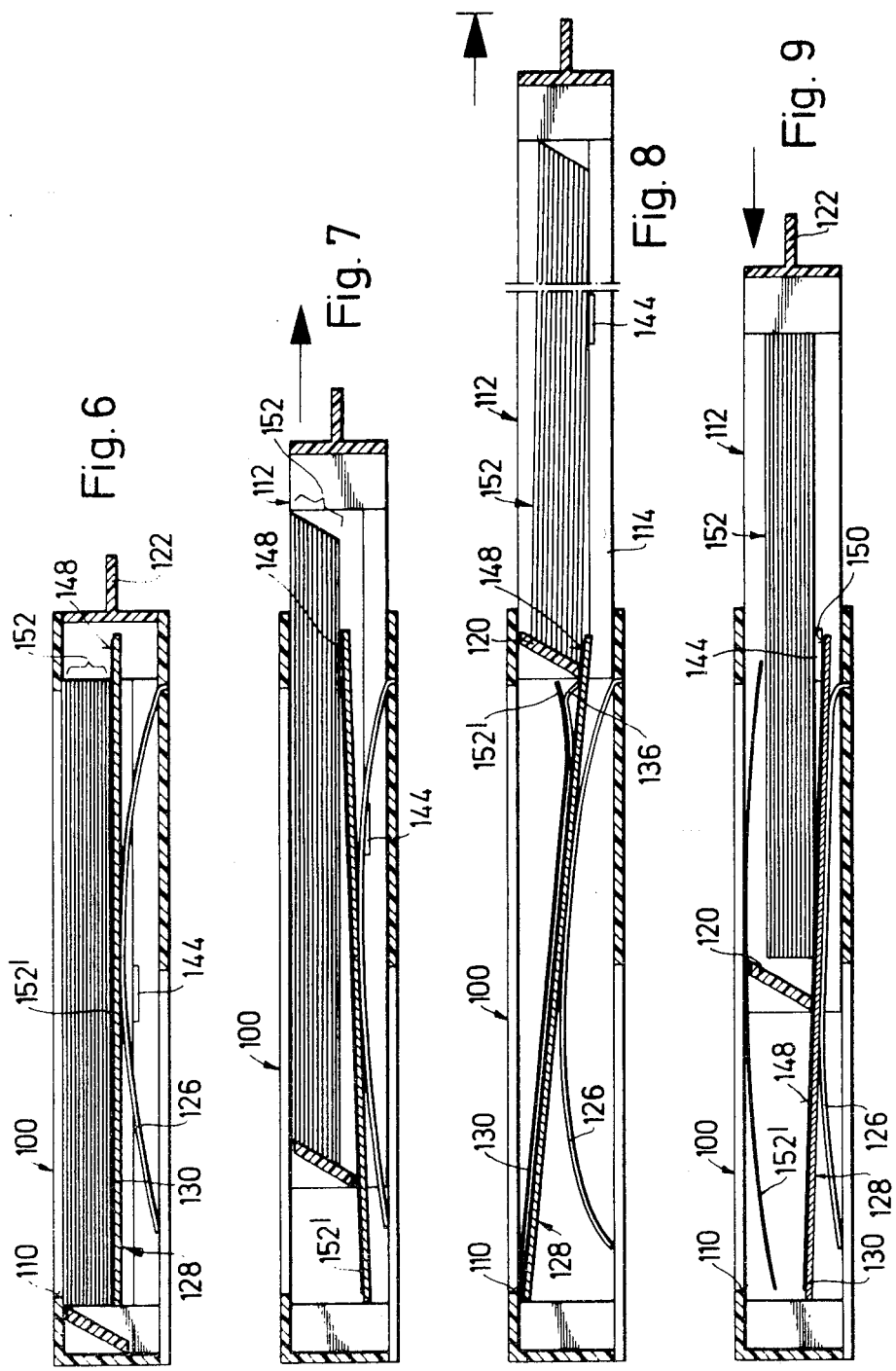

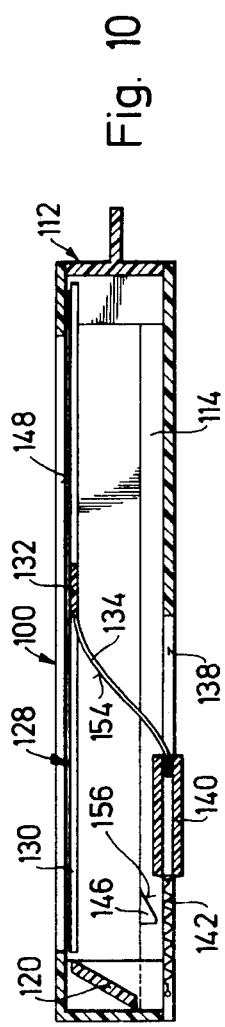
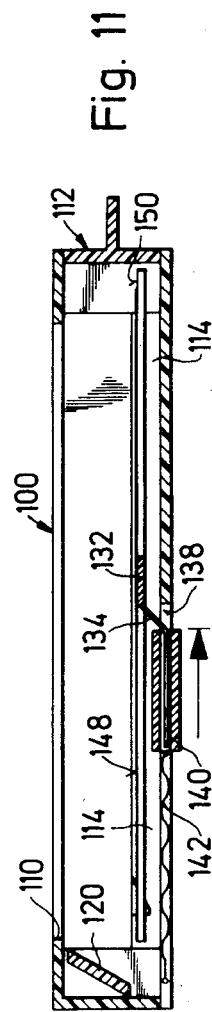
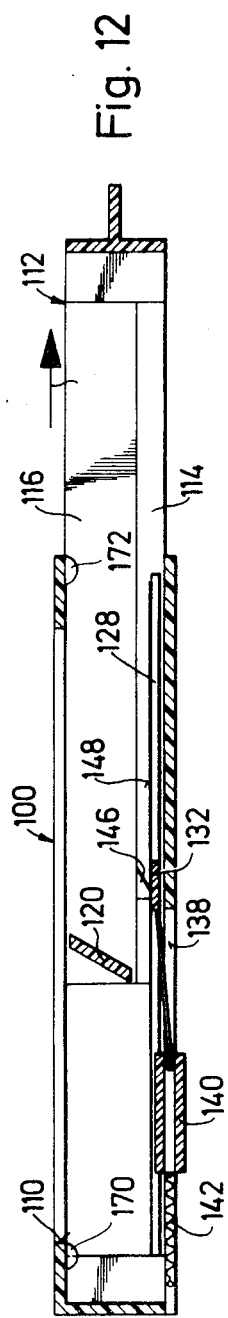
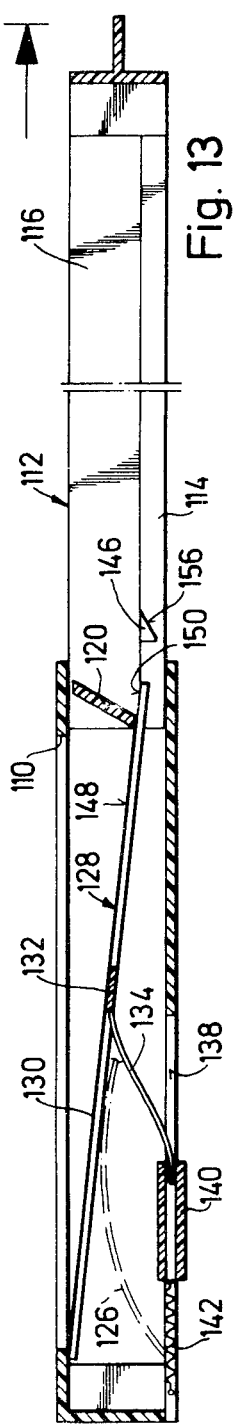

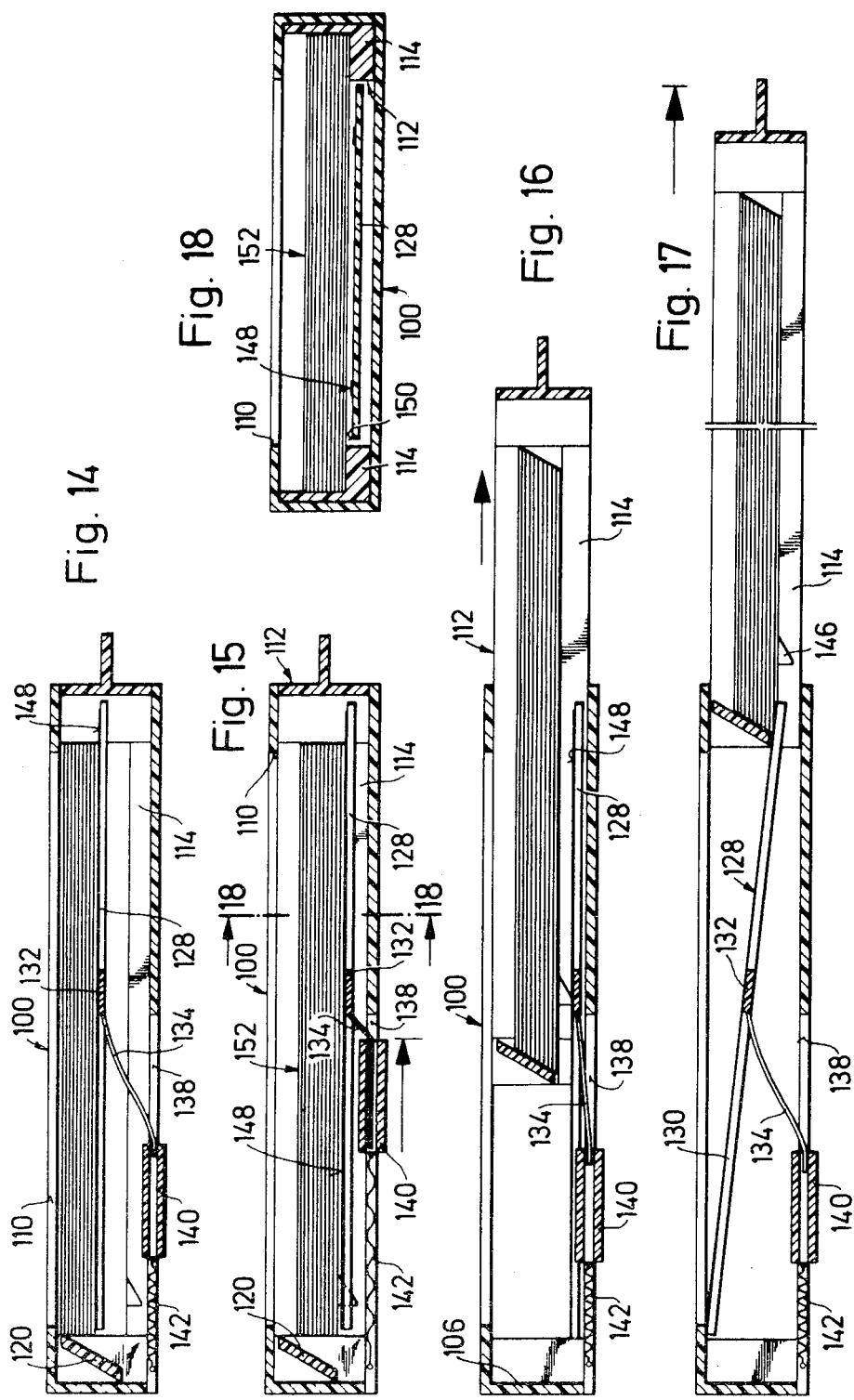

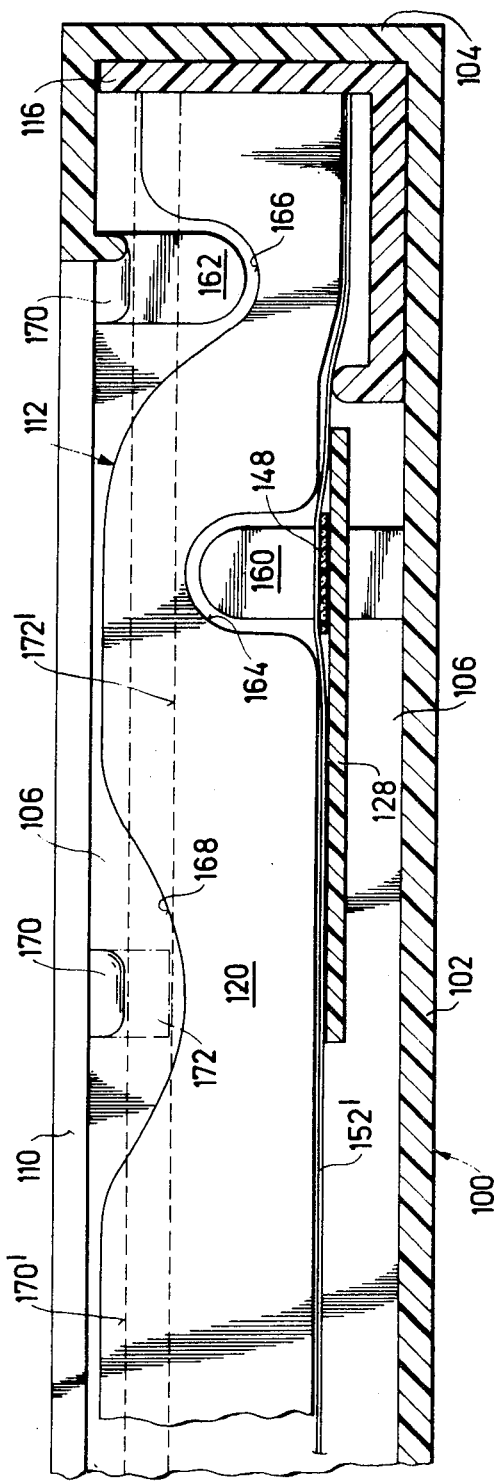

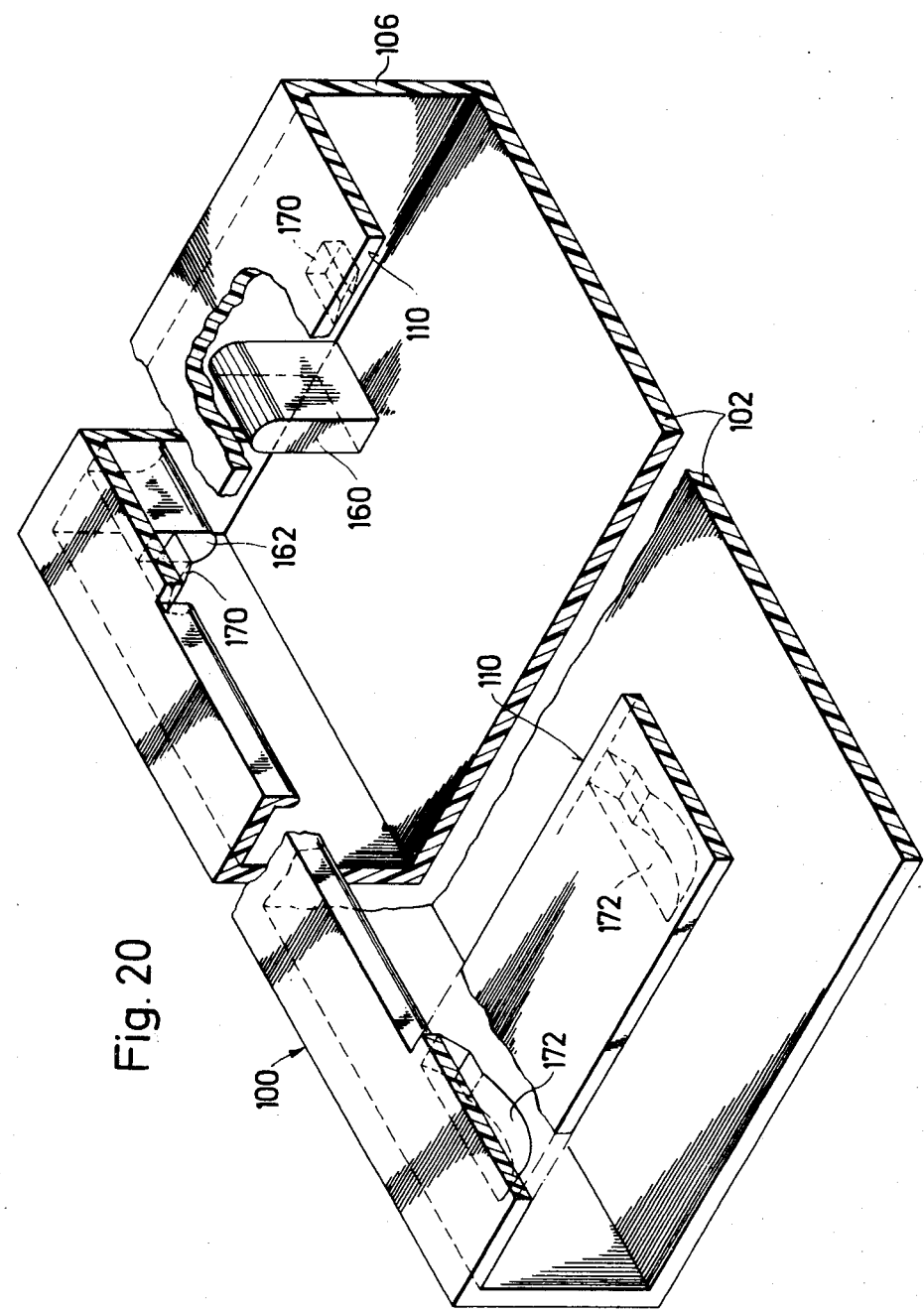

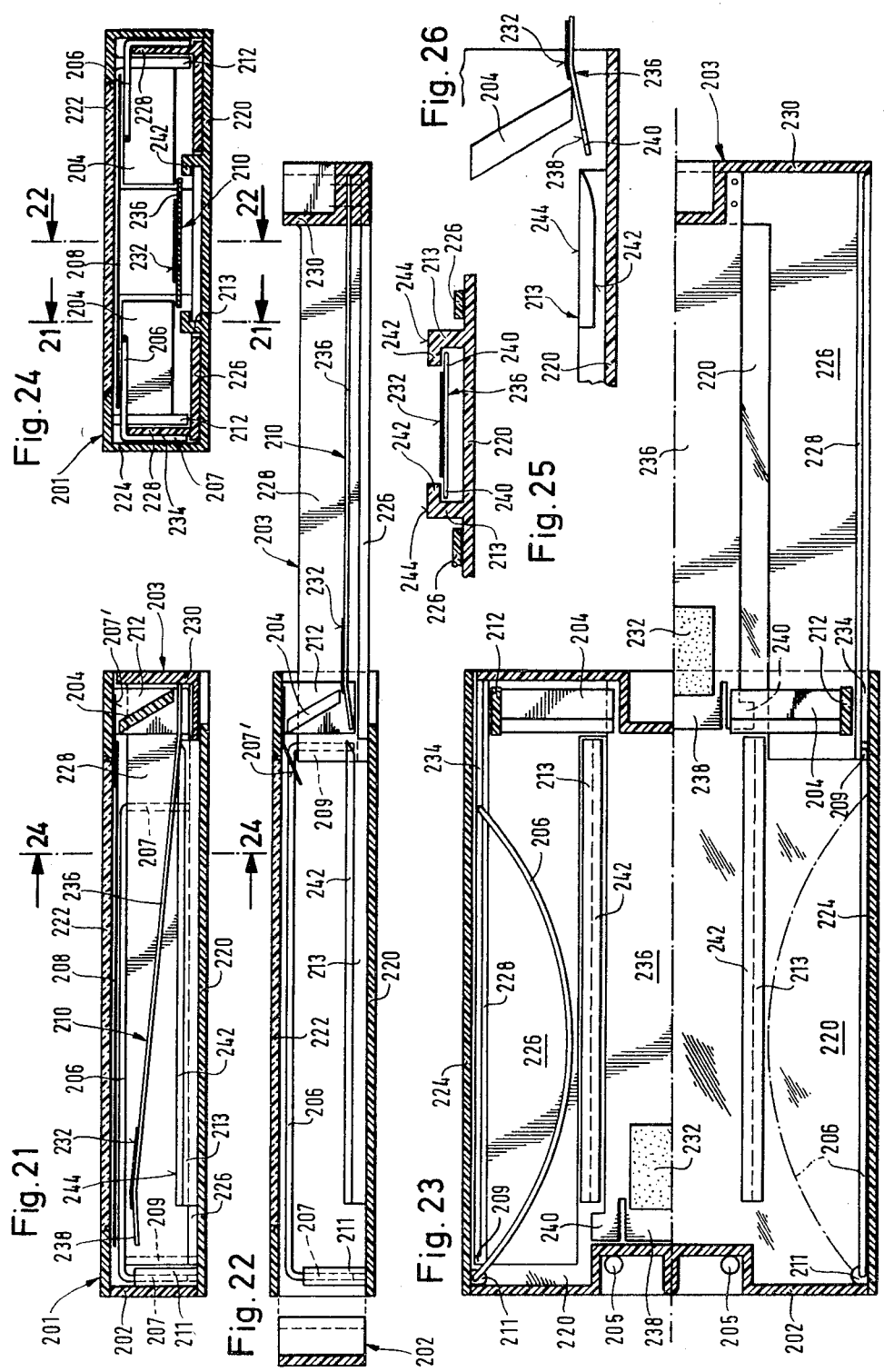

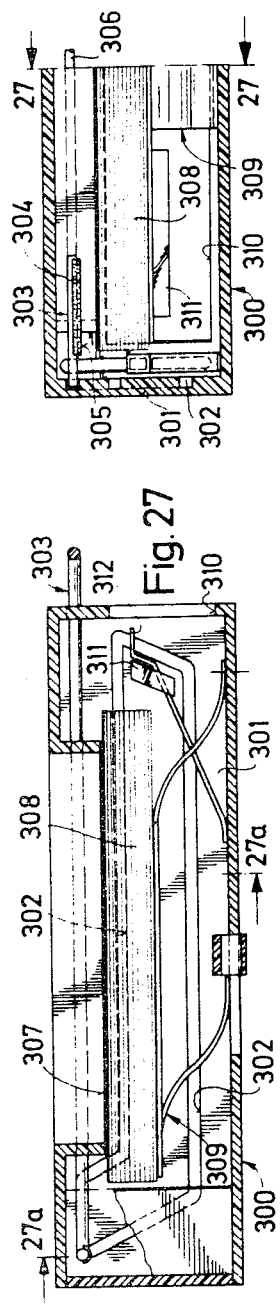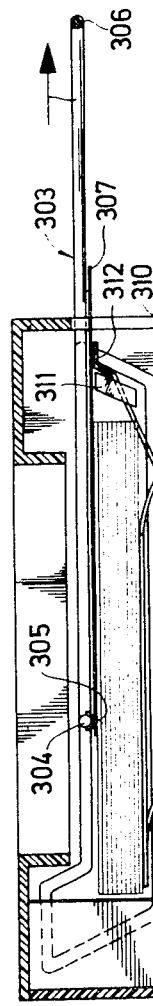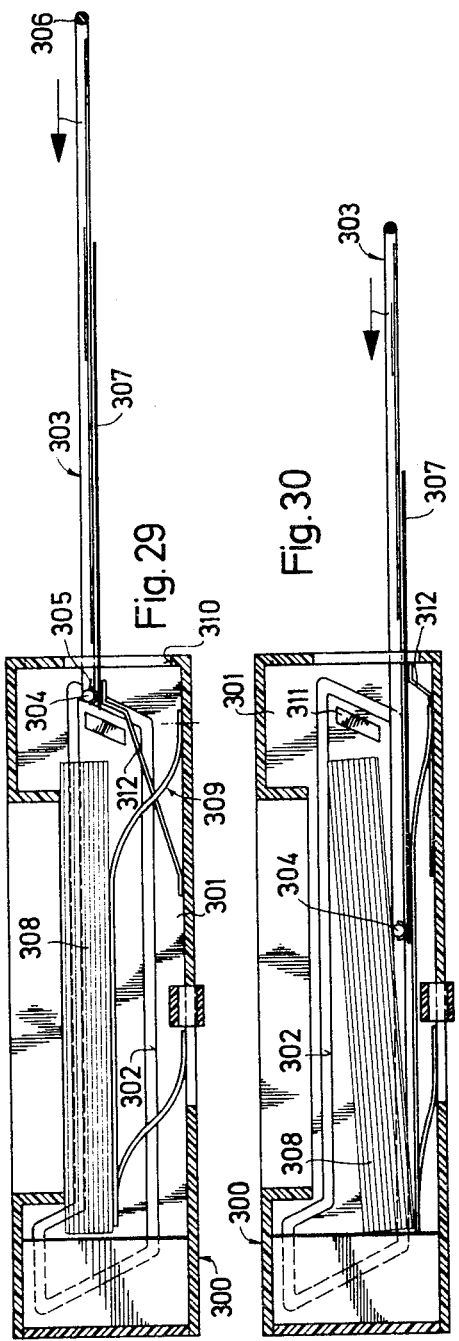

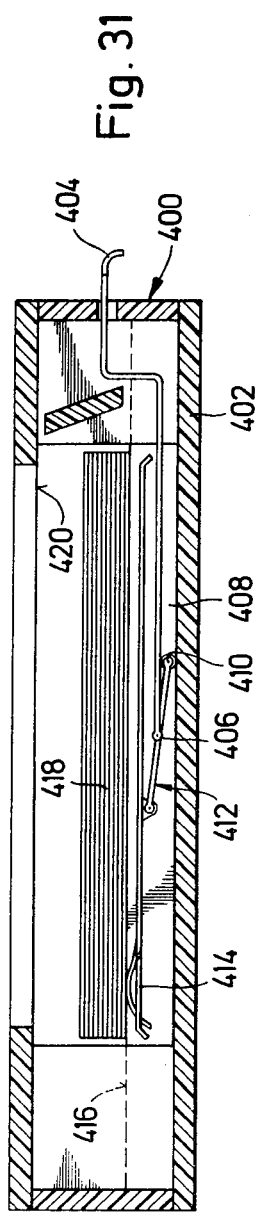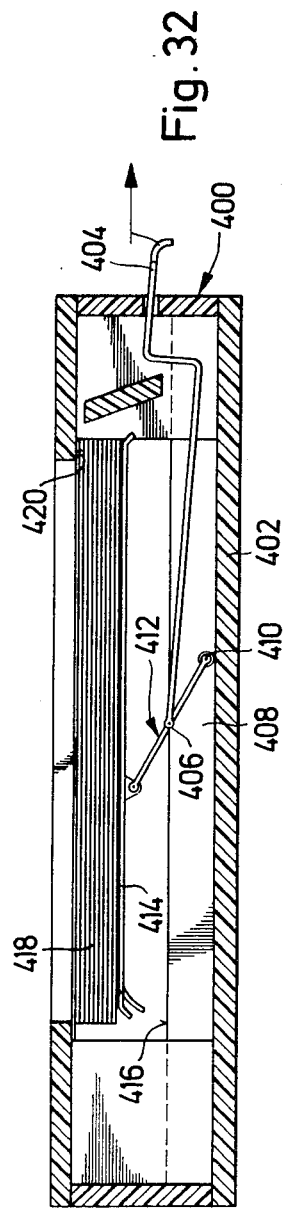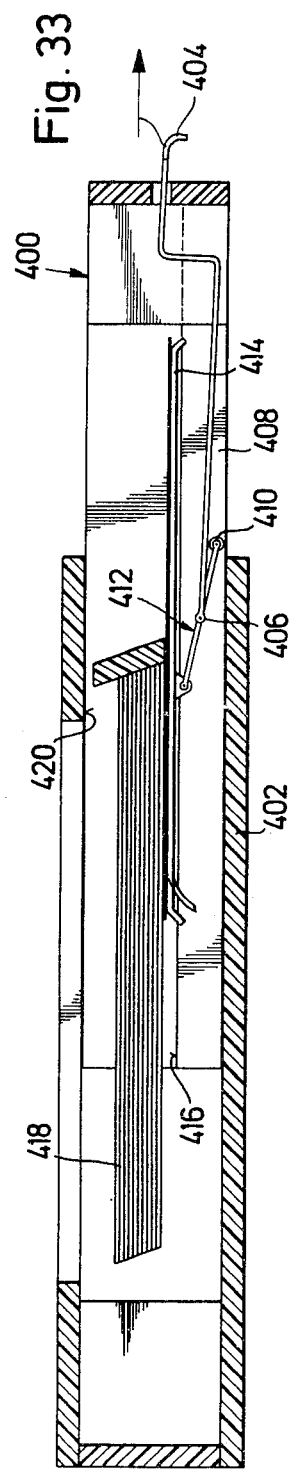

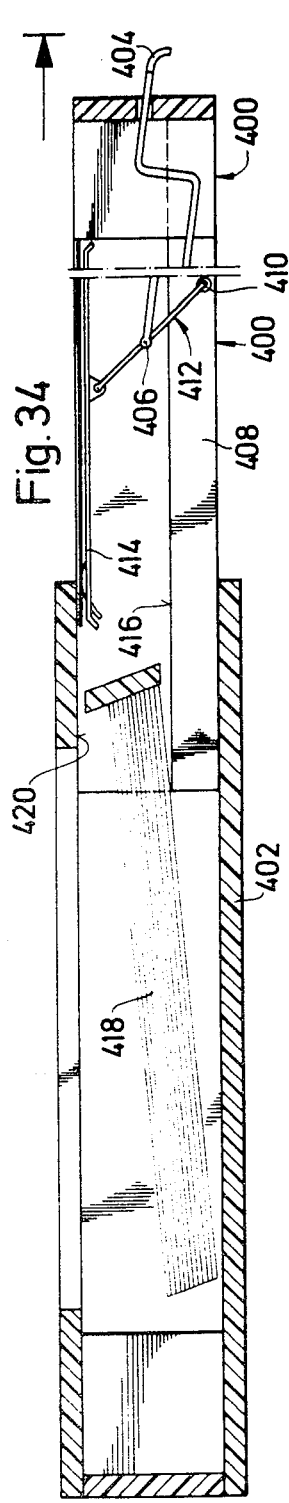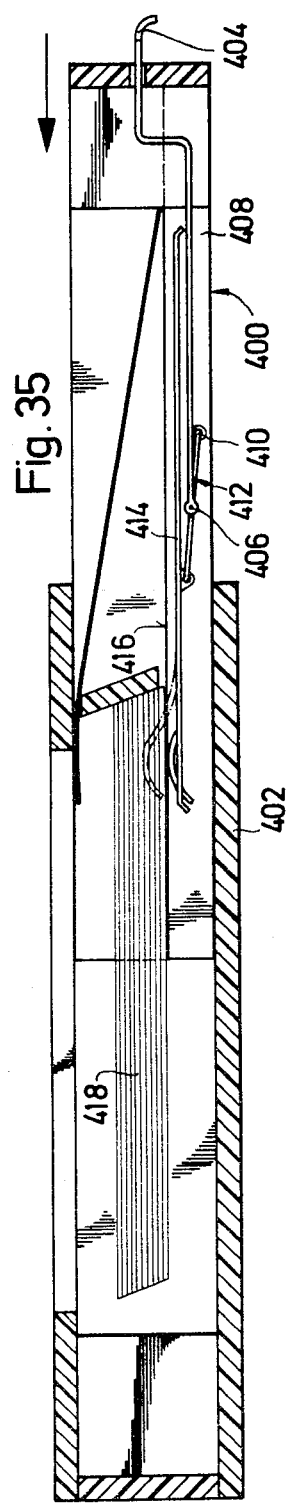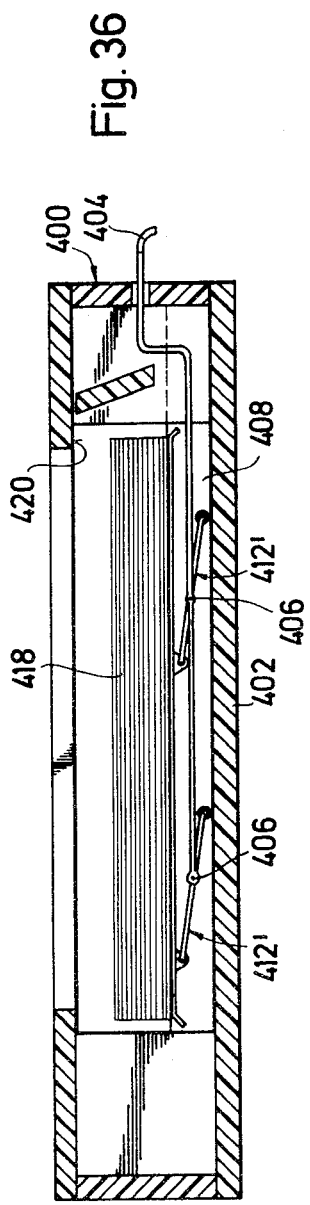

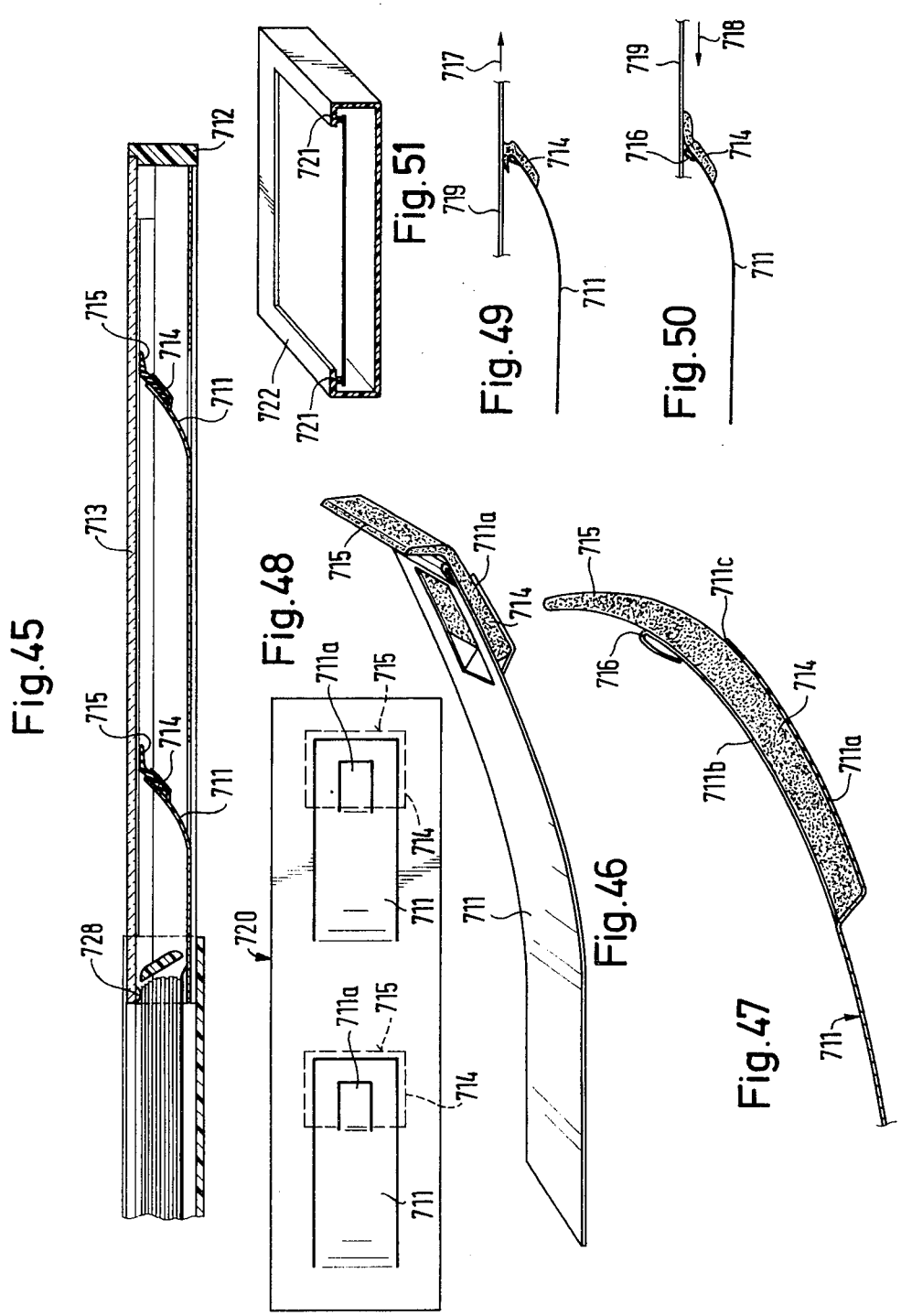

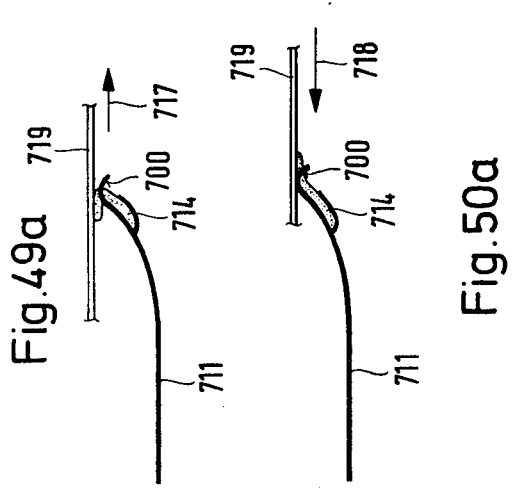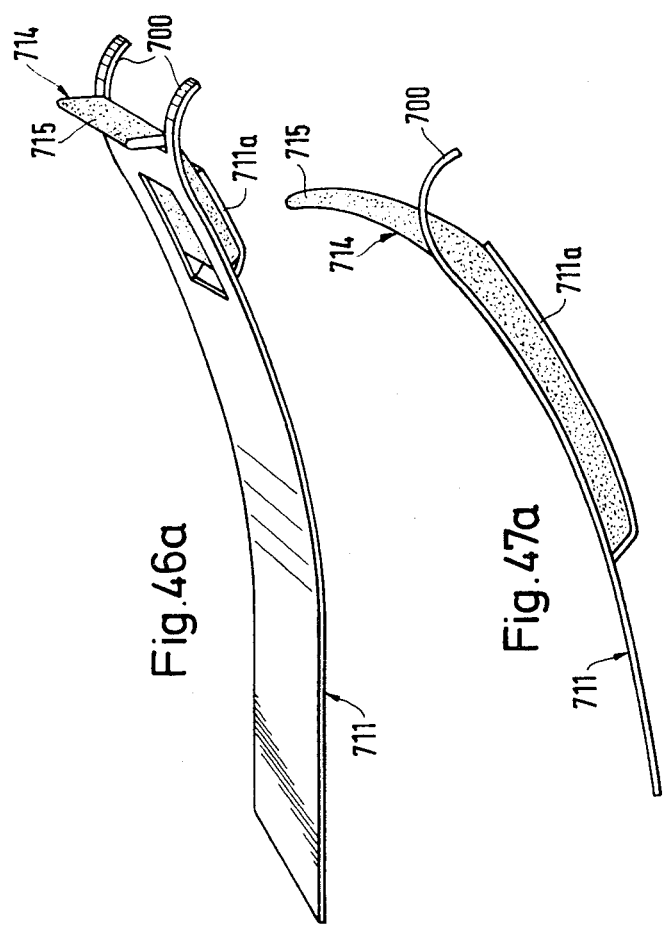

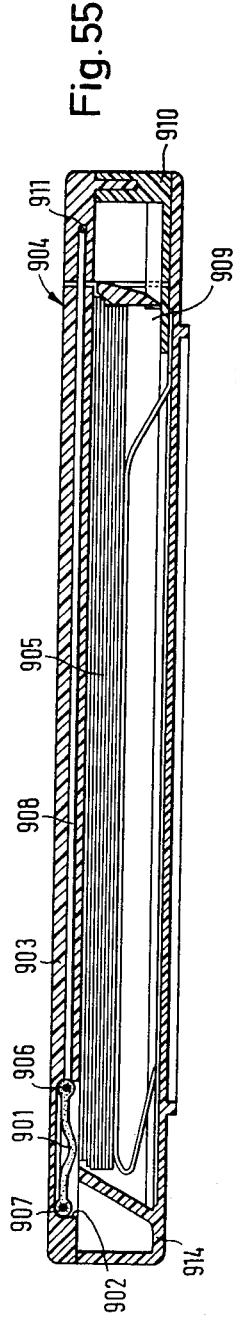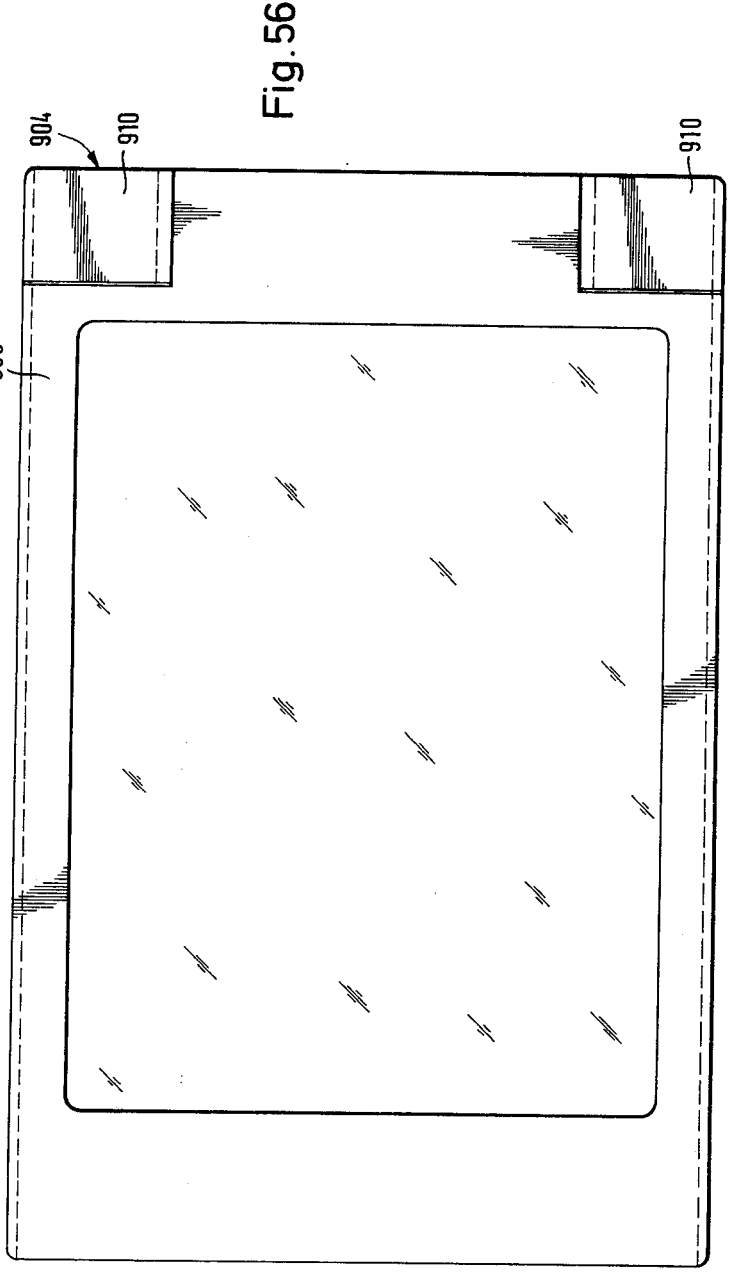

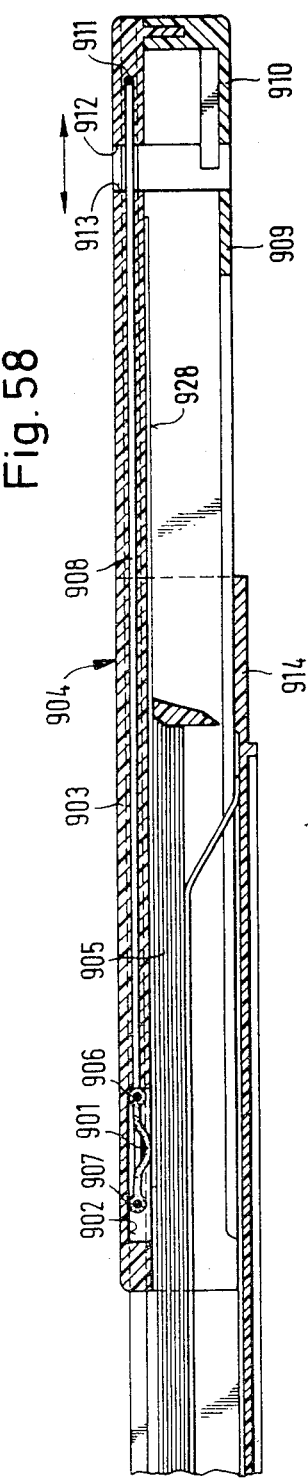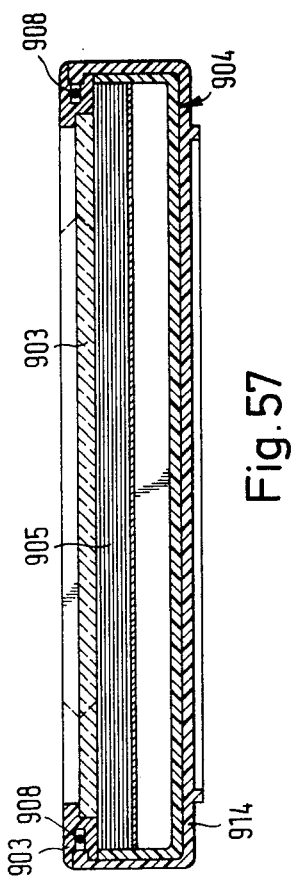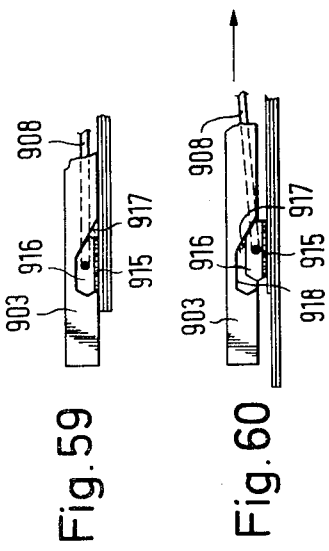

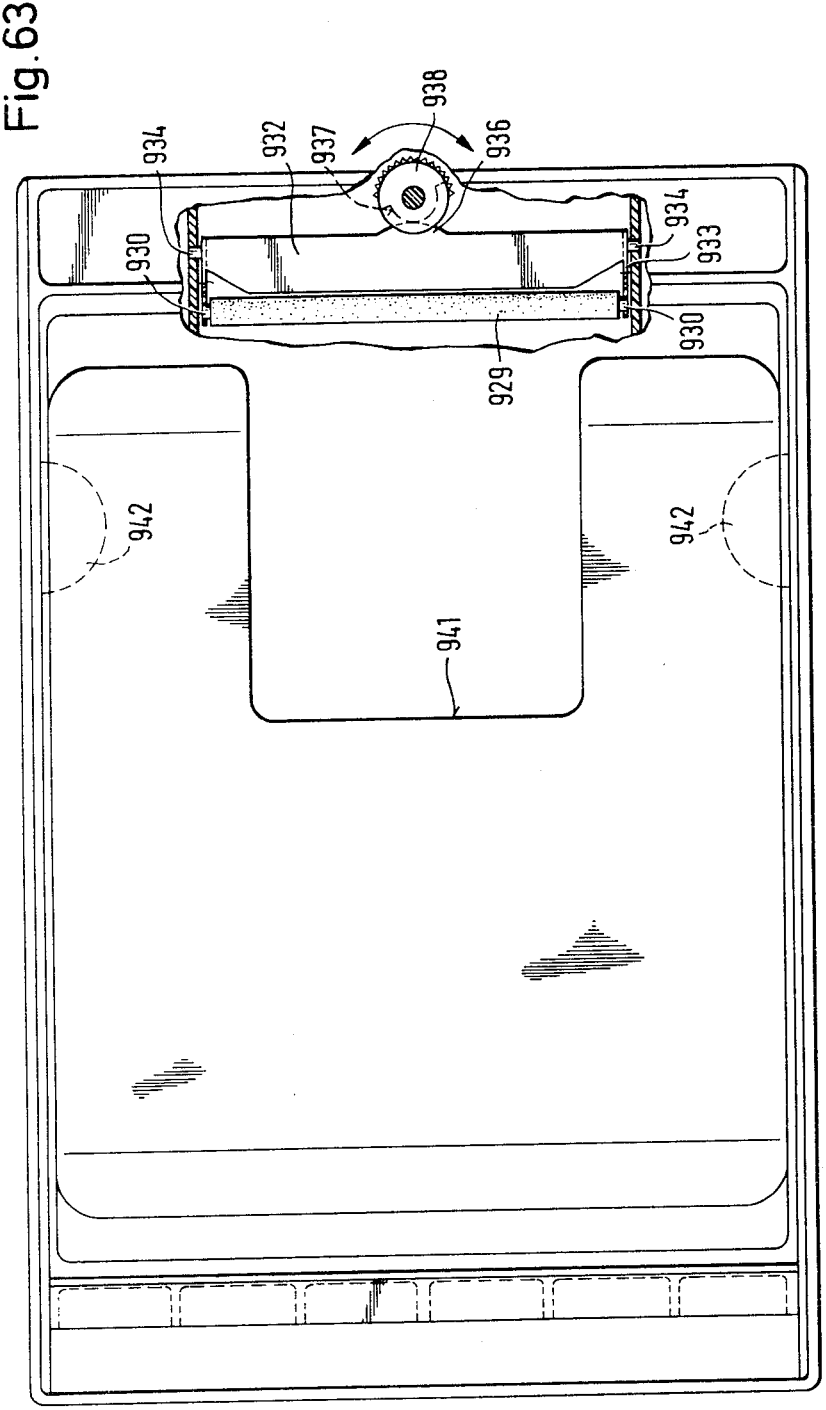

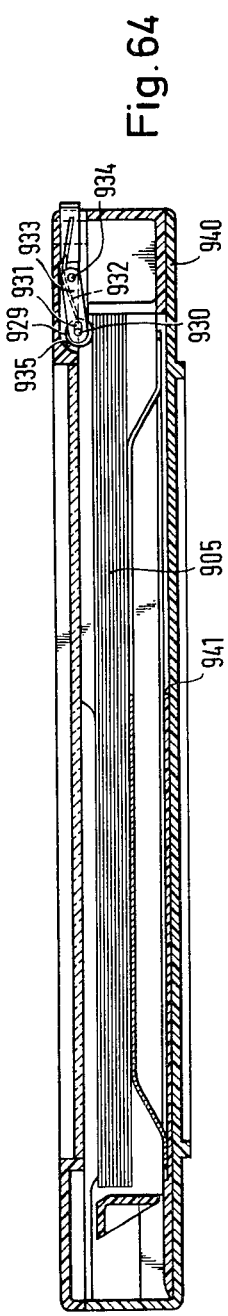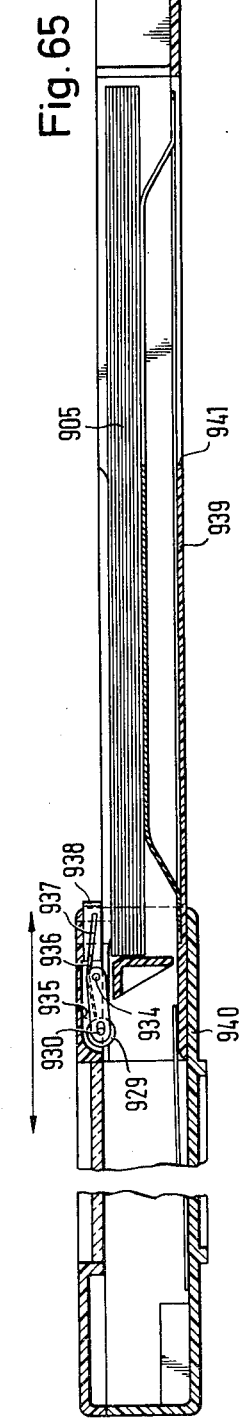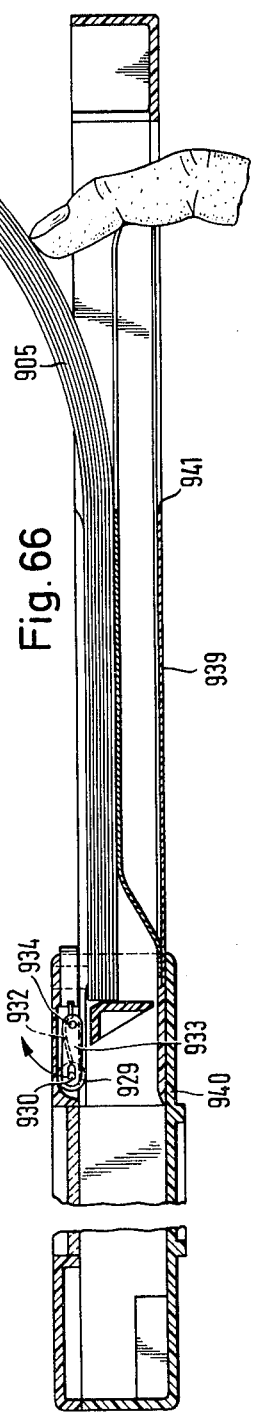

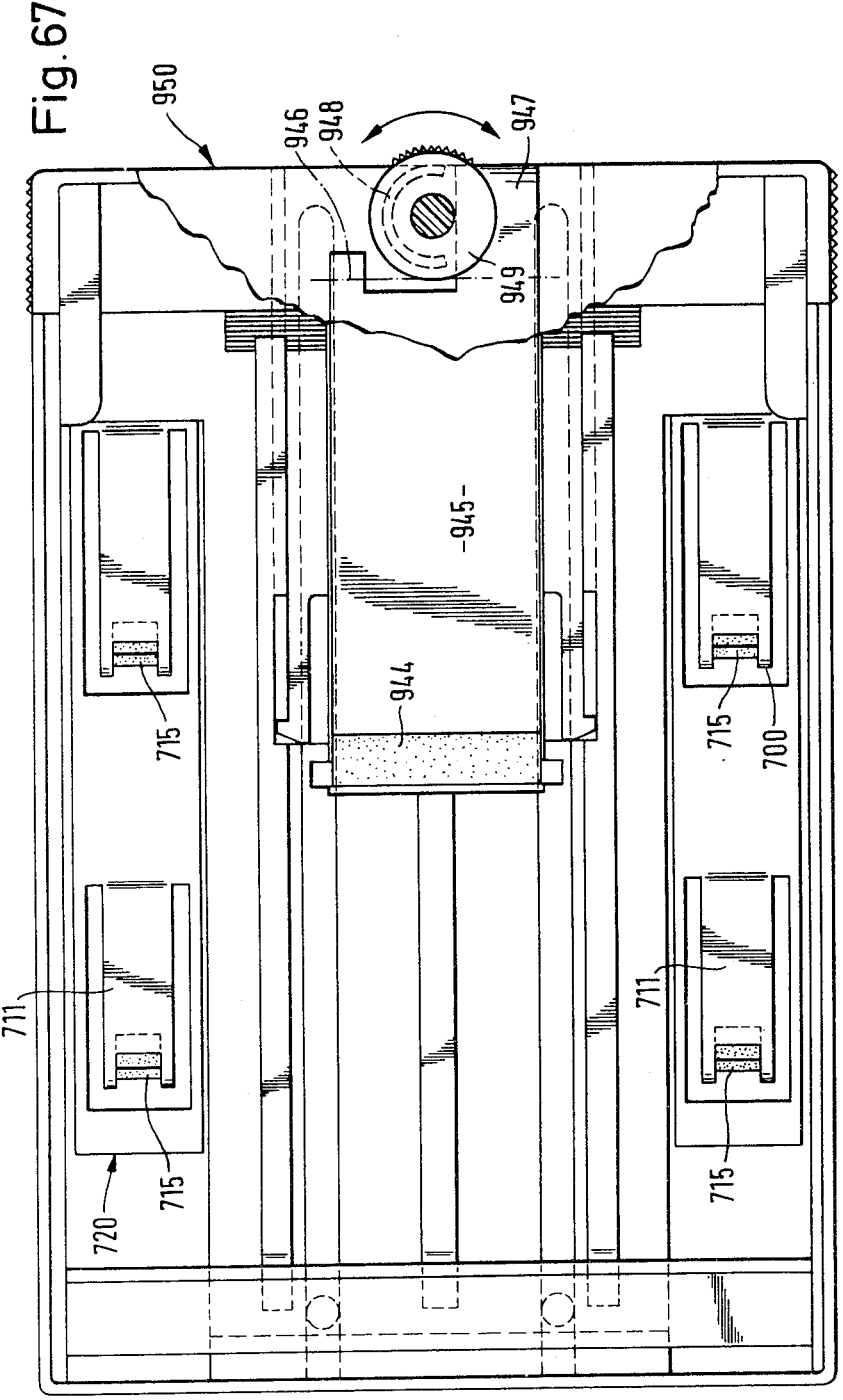

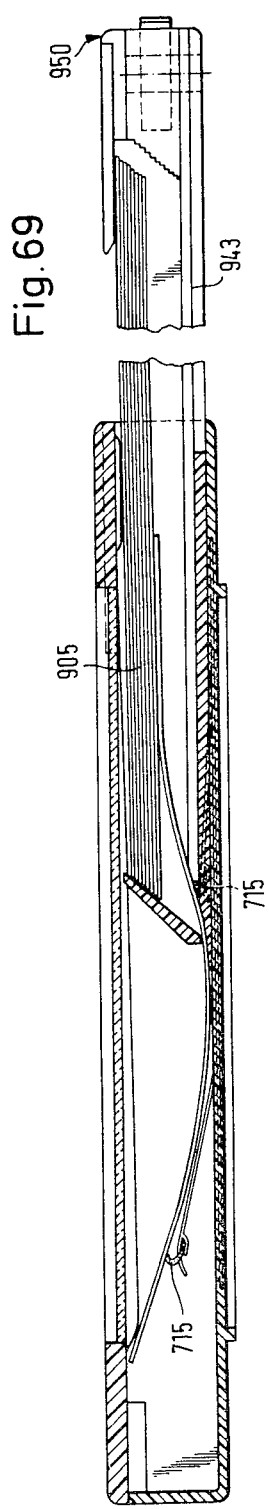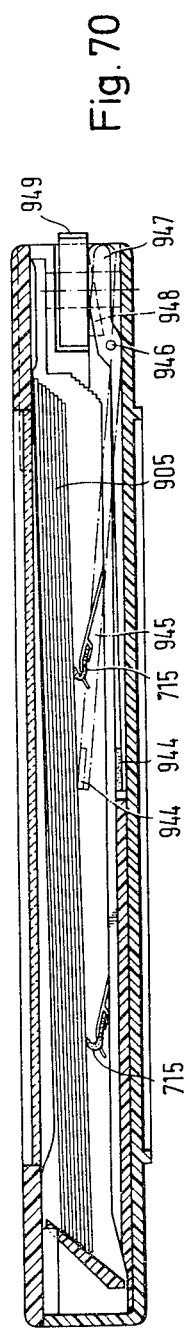
Fig. 69
Fig. 70

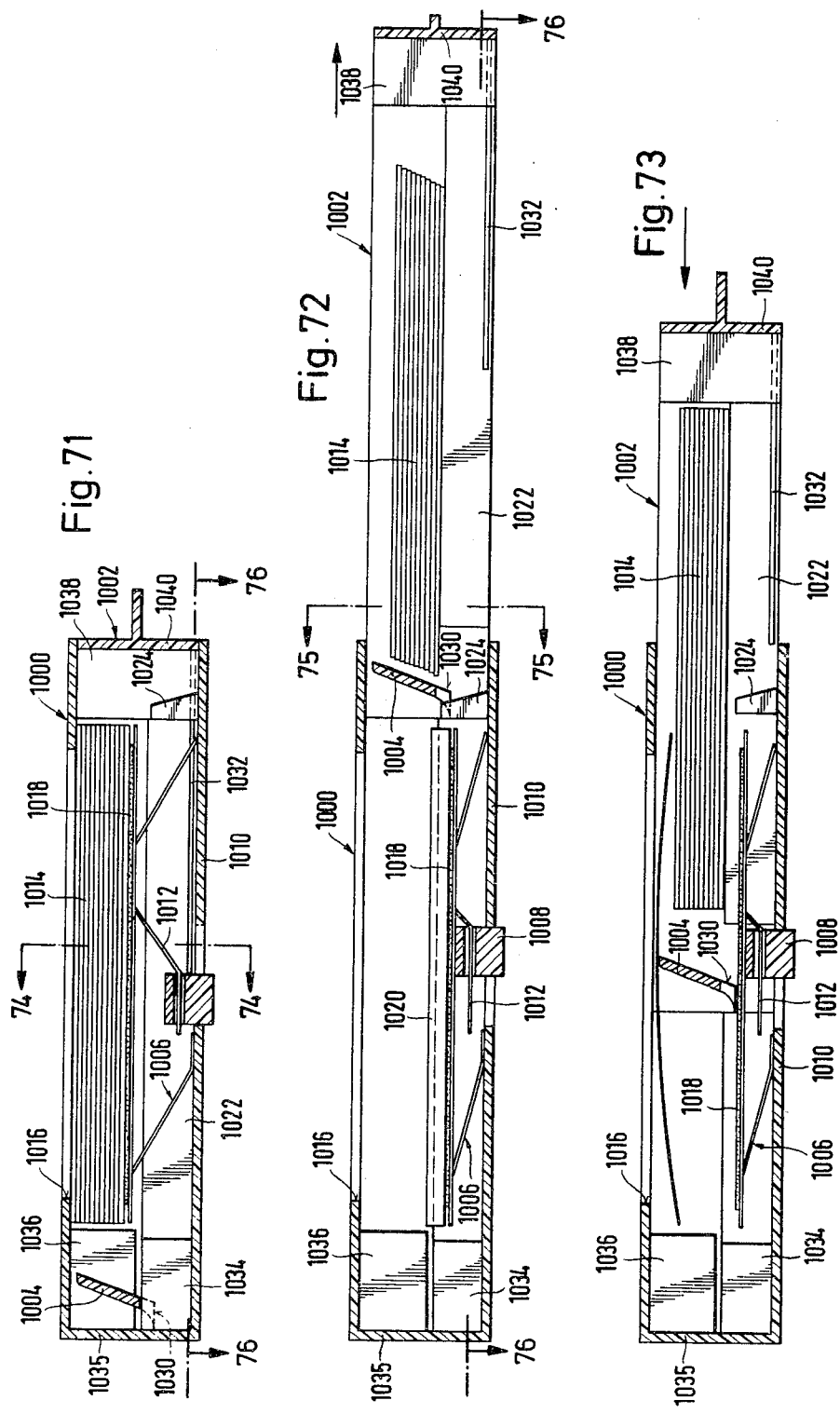

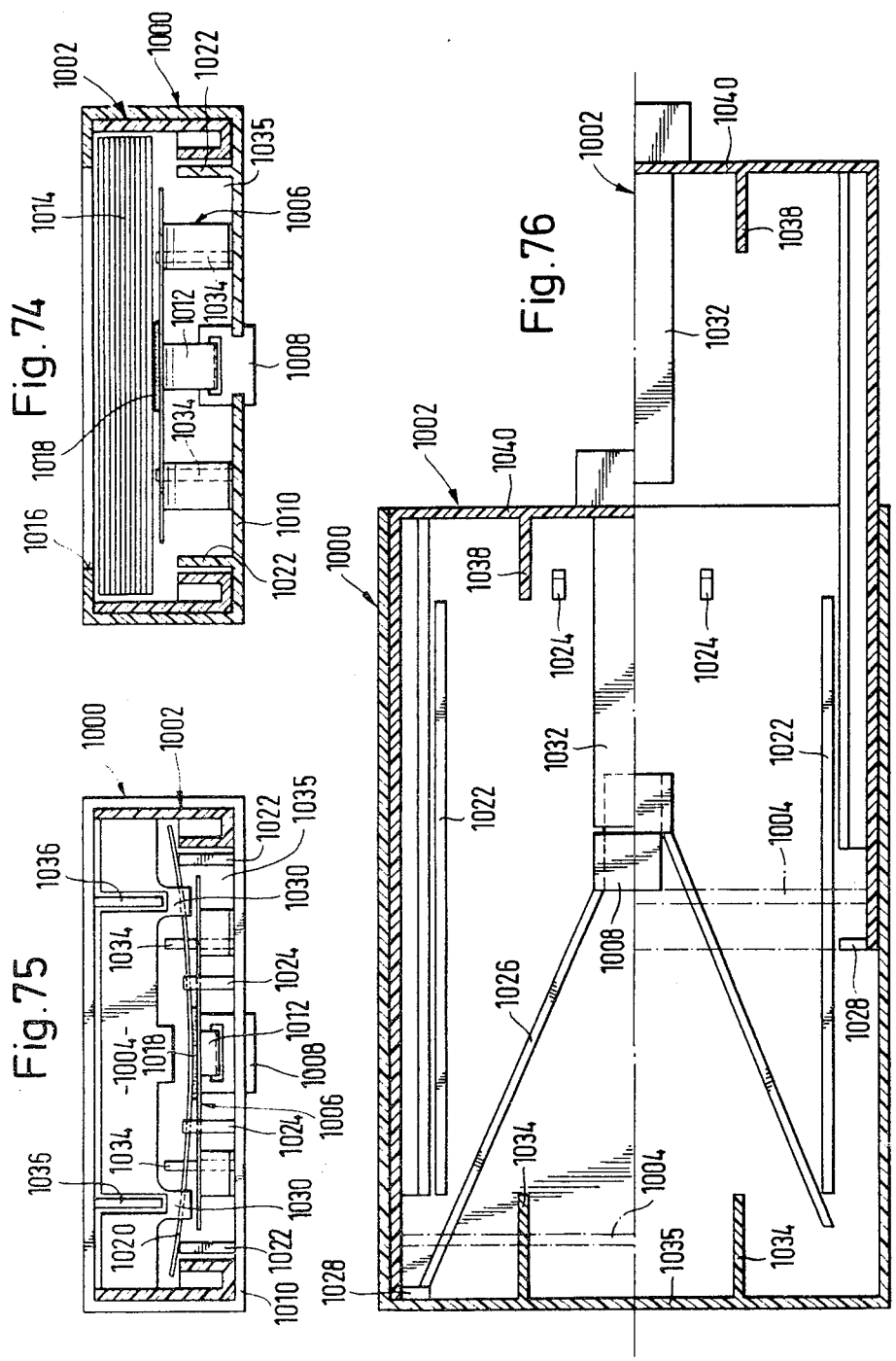

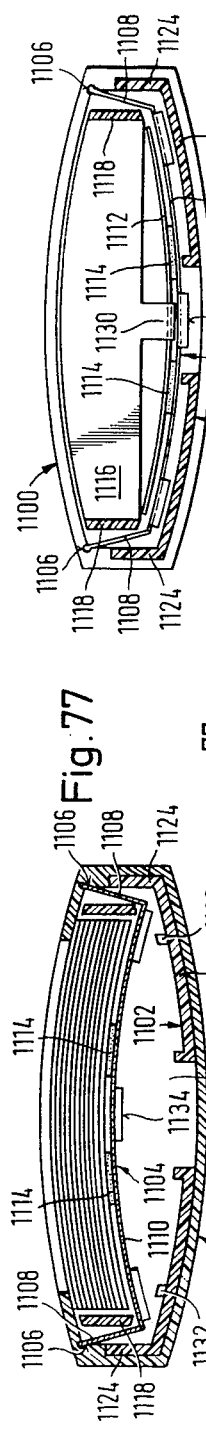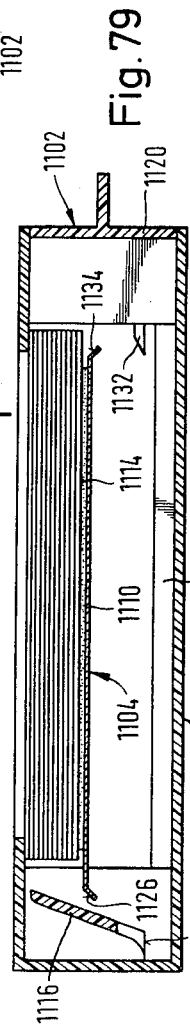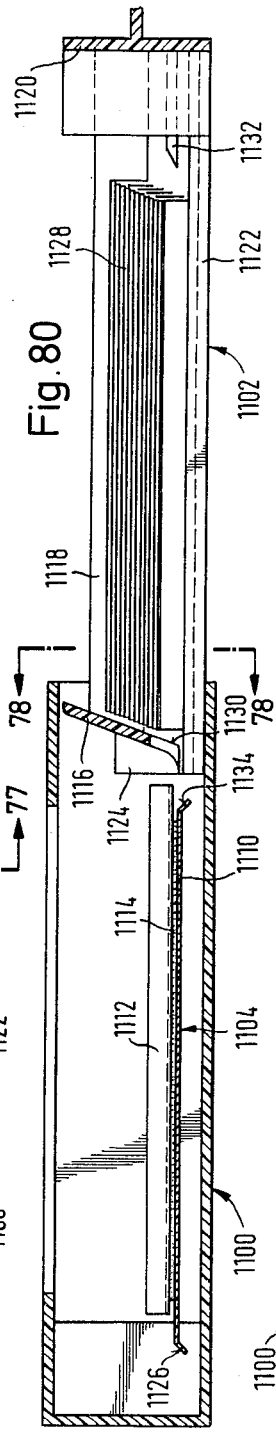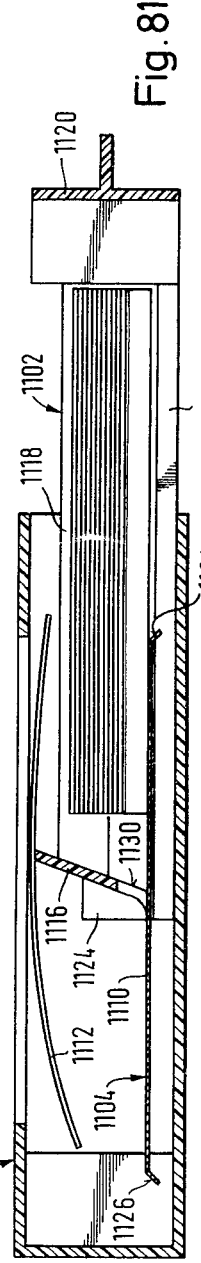

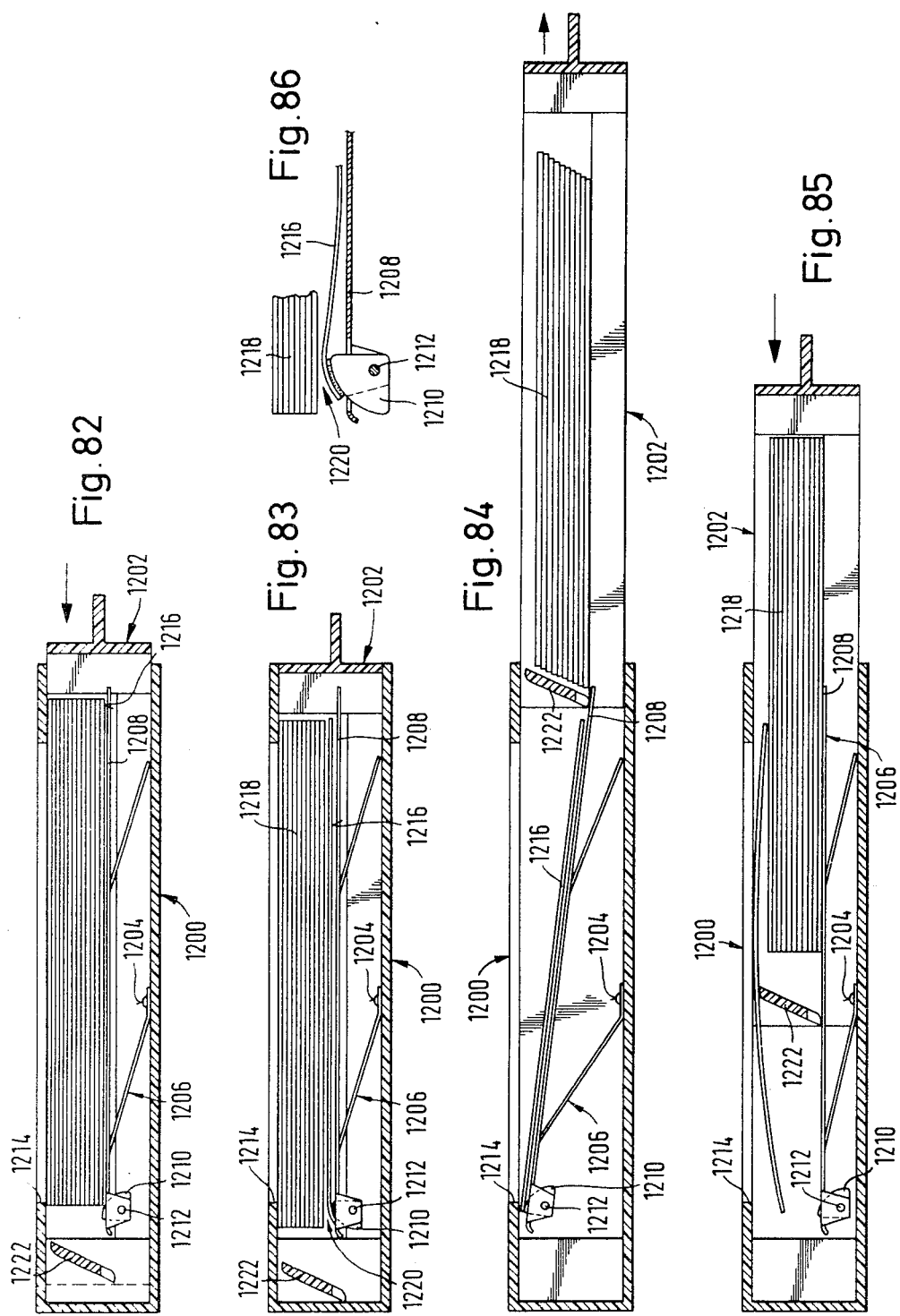

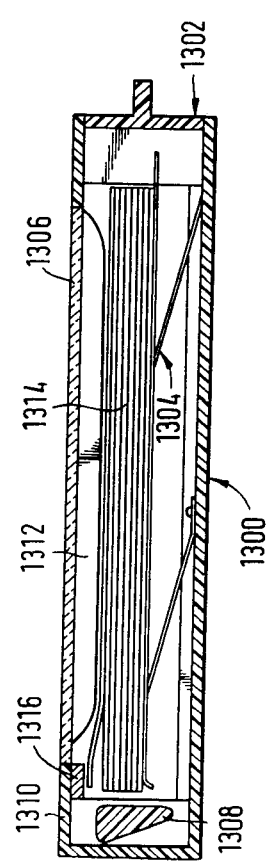
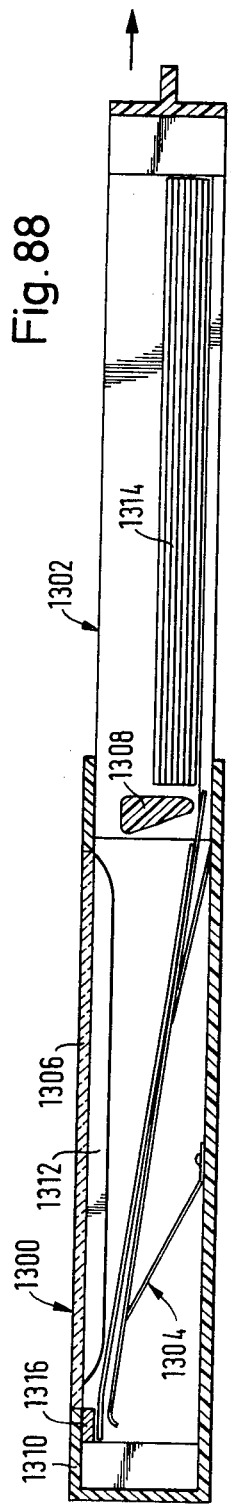
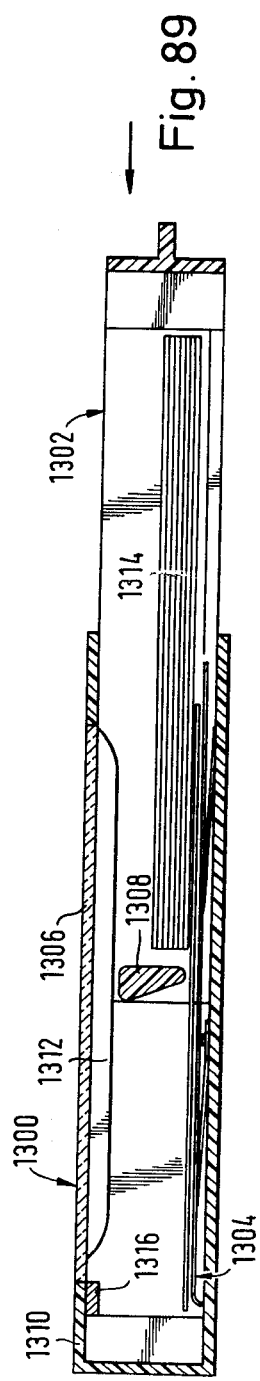

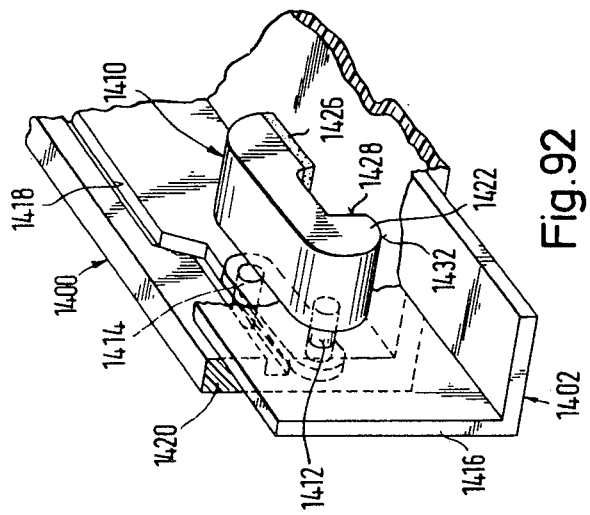
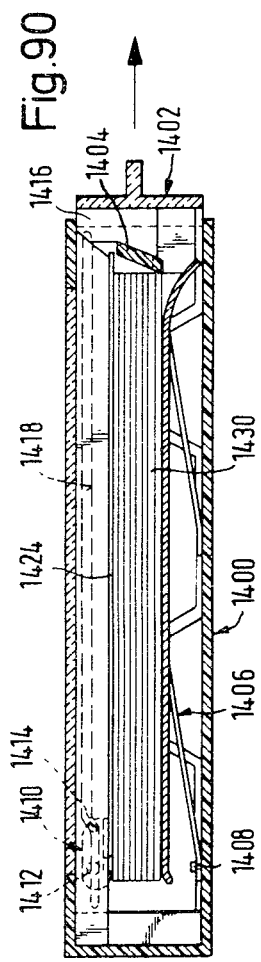
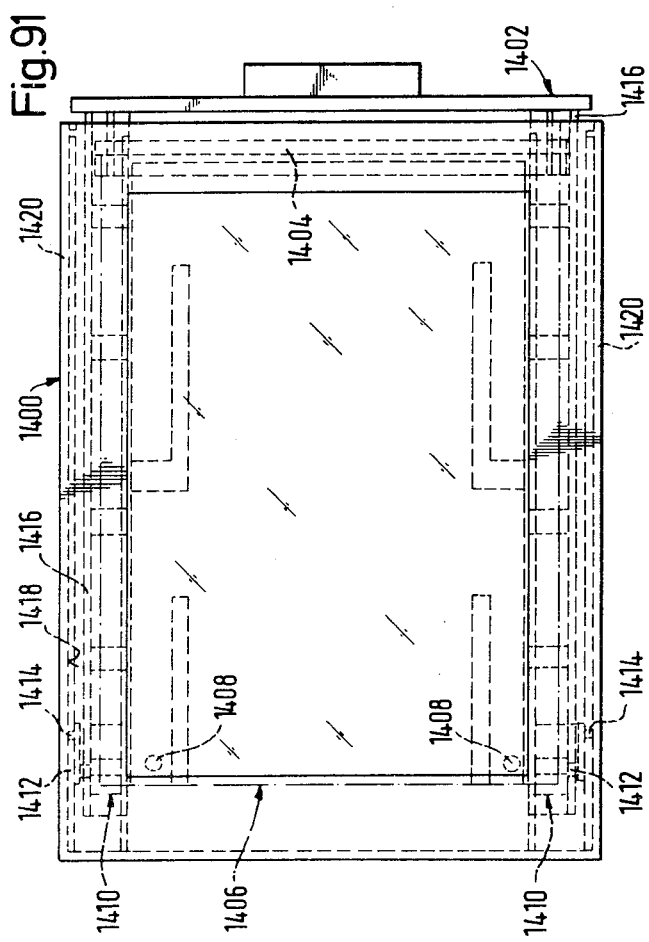

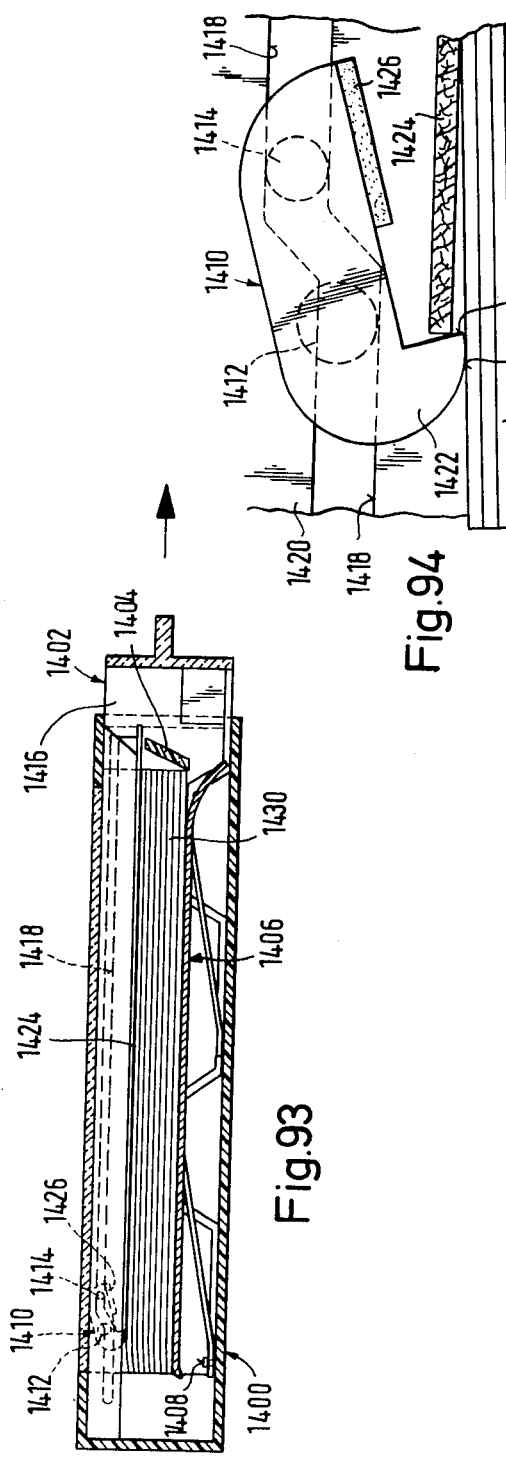
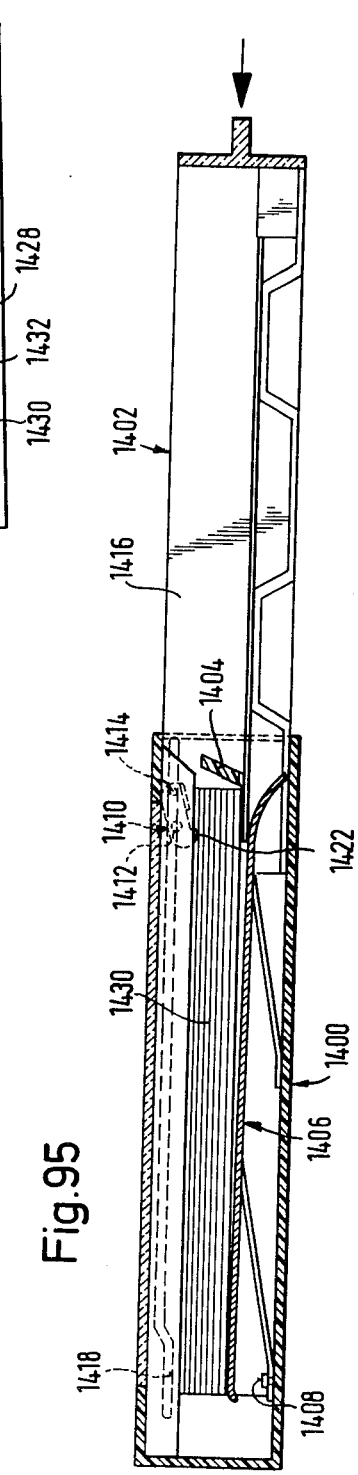
Fig. 93 Fig. 94 Fig. 95

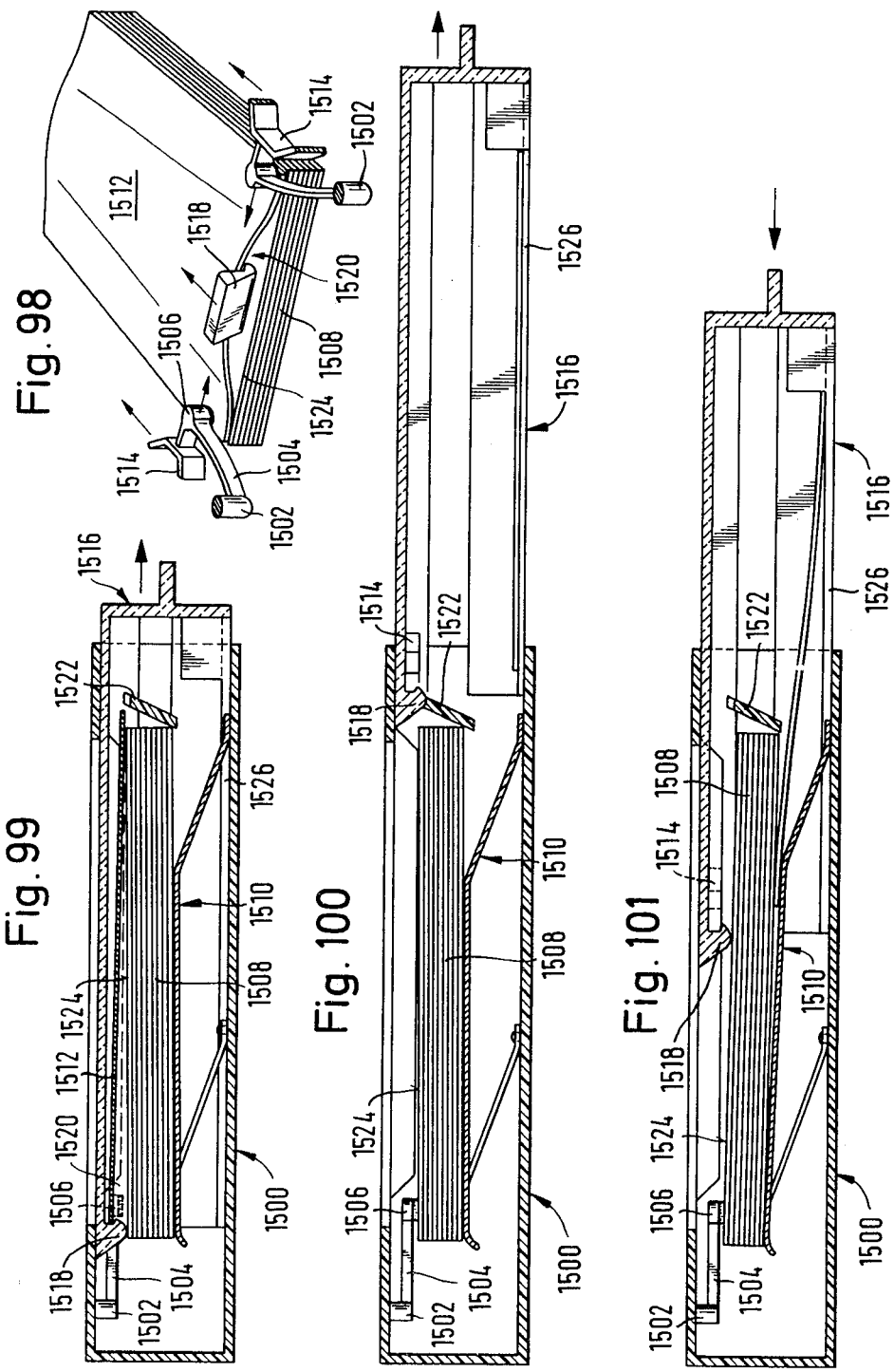

Fig.102
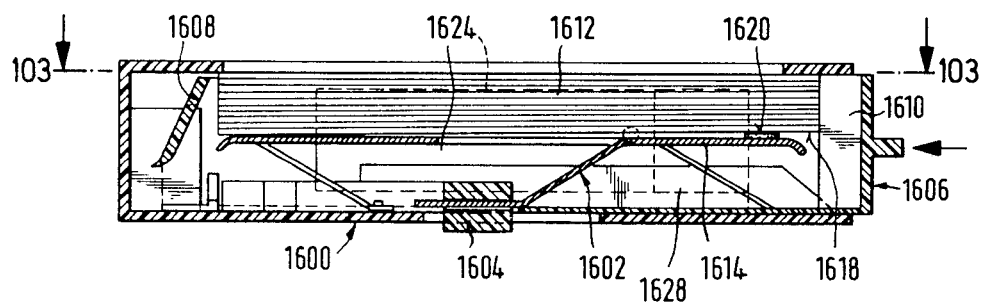
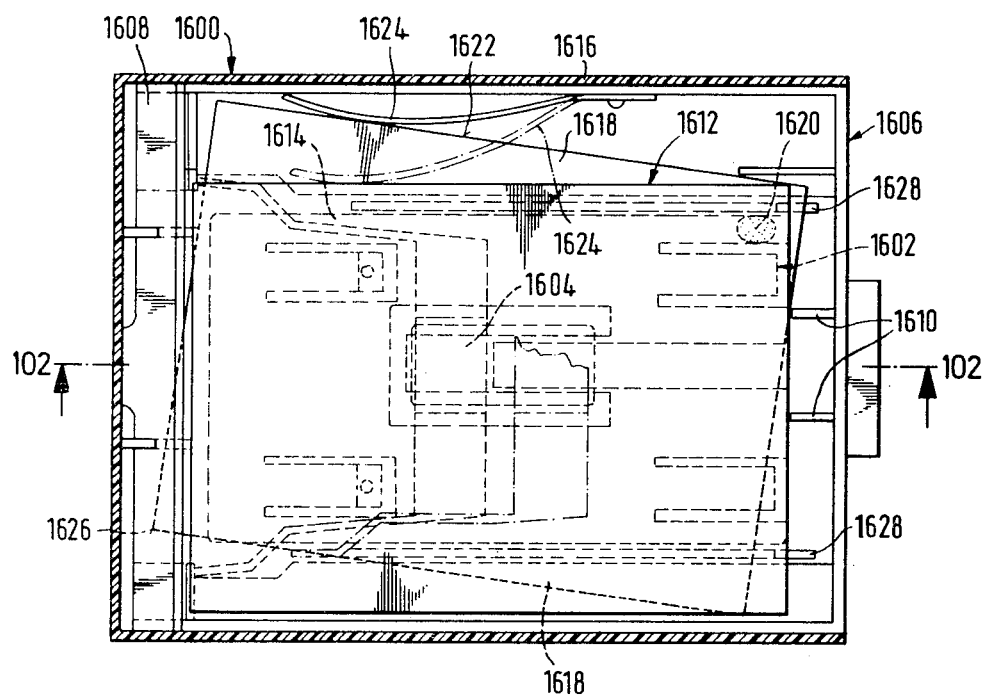
Fig.103

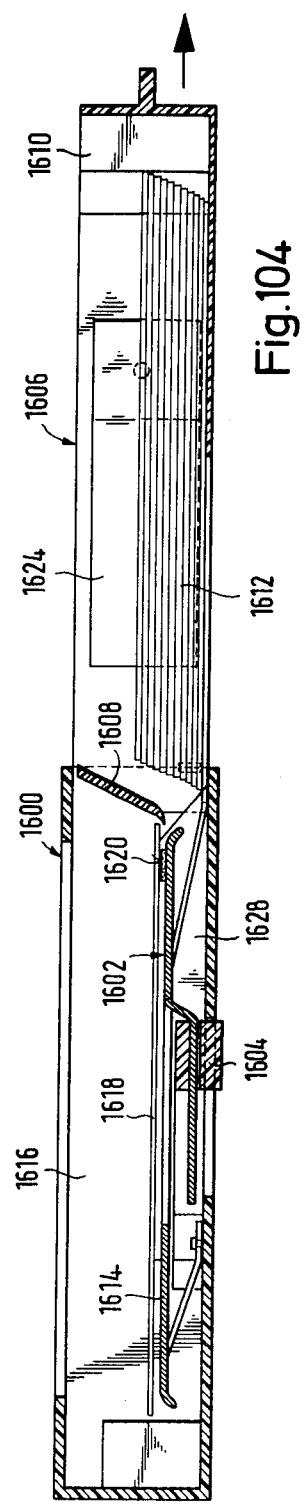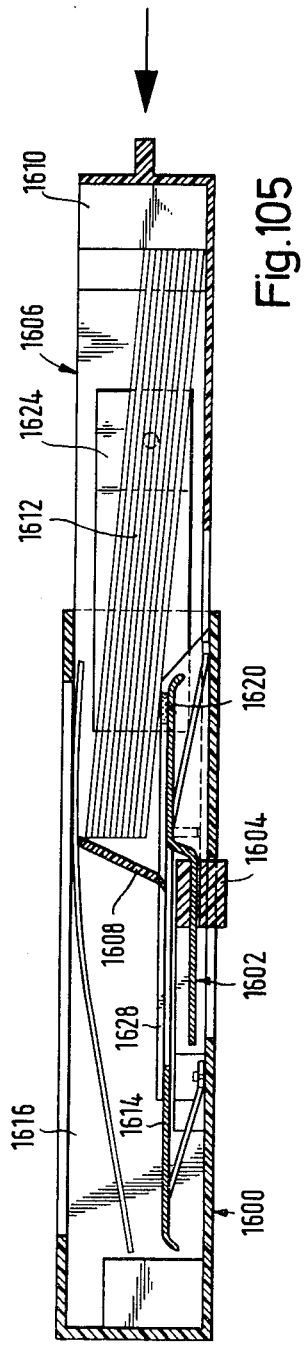

PICTURE VIEWER

The invention relates to a picture viewer having a picture change mechanism.

BACKGROUND OF THE INVENTION

Such devices have been known for many decades (German Patent Specification No. 179 675, German Patent Specification No. 224 700, German Patent Specification No. 873 908). They are all based on the following principle.

In a shallow housing having a viewing window which may, if desired, be covered by a transparent plate, there is a pile of pictures, the uppermost one of which is exposed to view through the viewing window and is supported at its edges. A pressure arrangement using a spring holds the pile pressed up against the window or the frame thereof. Laterally, the housing has an aperture through which a slider member may be pulled; the withdrawal movement of the slider member is limited by stops. Near to the housing aperture there is a member referred to here and hereinafter as a separator which extends the width of the aperture and which at the top and the bottom leaves clear a narrow slot for a picture to pass through. When the slider member is pulled out, the uppermost picture is pulled away through the upper slot by a hook-like transporter, the remainder of the pile being held back by the separator, and during the return movement of the slider member the picture is pushed through the bottom slot under the pile again or, more accurately speaking, between the pressure arrangement and the bottom-most picture of the pile. The second uppermost picture is now in front of the viewing window and the process can be repeated as often as desired.

This principle is extremely useful for perfectly flat thick plates, as mentioned in the first-named publications, because the transporter hook then engages sufficiently deeply on the edge of the plate and does not slip off. But with paper pictures, for instance photographic prints, having a thickness, for example of ¼ mm or even less, there is a high probability that the hook, which itself must have a depth of penetration that is less than the smallest picture thickness, will slip off the edge of the picture or will not grip it at all, especially when the pictures have edges trimmed at an angle or if they are curved or distorted. The hook slipping off may lead to the hook scratching over the viewing side of the picture and damaging it. Furthermore, even when the carrier material of the picture is pliant, the hook will in the course of time wear down its clear-cut edge and will then be even less able to grip; in addition, the pliant picture carriers become deformed, twisted and possibly even torn at the side at which the hook engages, with the result that the device then no longer functions at all with these pictures.

It is an advantage in this design that the overall depth in the direction of the pile thickness is relatively small.

With a stereo viewer according to German Patent Specification No. 864,759, a picture is removed from a pile by means of a roller turned by hand and is conveyed beneath the pile again by means of a second roller. Admittedly, damage to the picture is here avoided, but the overall depth of the viewer is inevitably very much greater than in the case of the slider member design.

BRIEF SUMMARY OF THE INVENTION

It is an object of the invention to produce a picture viewer with an overall depth that is only slightly more than the thickness of the pile of pictures, is operationally reliable as regards its transporting function, and even in the case of relatively thin paper pictures, and especially in the case of photographic prints, avoids damage to the edges of the pictures and also to the faces of the pictures by the transporter.

The picture exchange operation consists of two individual steps: The separating of the picture to be exchanged from the pile and the transport of the separated picture parallel to itself. In the known devices these two steps follow immediately to each other, it being understood that since the static friction always exceeds the sliding friction, the starting of the picture motion requires more power than the further transport and thus may be identified as said first step. It will further be understood that the further transport of the picture once separated from the pile will not involve considerable problems any more.

In the device according to the invention thus a surface-adhesive member in each case serves the purpose to separate or loosen the picture from the pile, the motion of the one picture relative to the pile being obtained by shifting, turning, bulging and lifting of the entire picture or lifting of but one edge or corner thereof. Moreover, however, the surface-adhesive member may be used simultaneously as the transport element for further transport of the picture thus the member is the transporter, or at least a portion thereof in the sense of the definition used above.

As far as the member is expected to lift the picture perpendicularly to its main surface from the pile, the adhesion of the member must be rather great. In this case glue-bonding compounds may be used which, of course, must not leave residuals on the pictures. In other forms the surface adhesive member may rely on subatmospheric pressure as suction cups or may rely on magnetic or static attraction.

If the picture is to be moved parallel to its own plane, usually members will suffice which have friction between the material of the member and that of the picture of a sufficient magnitude, wherein "sufficient" means that the adhesion has to exceed that which exists between the respective picture and the remainder of the pile.

Accordingly, materials may be used which exhibit inherently high friction coefficients as rubber and equivalent substances, bonding plastics (available on the market) but also of course all types of elements mentioned above for extremely high adhesive power.

In certain designs it may be desired that the adhesion will be selective such that in the desired direction of movement the adhesion is "sufficient" in counter direction, however, smaller than the friction between picture and pile; this may be termed a "one way clutch". Such types of elements involve pike bars, inclined brush bundles ("skin") or the like but moreover this problem may be solved by design features in that for example the adhesive member is in engagement with the picture but during the separating phase, however, held spaced from the picture during the reverse motion.

Finally, it is to be noted that in all or almost all mentioned types of surface-adhesive members there is the possibility to make the adhesion occur or become sufficient only in relation to pictures to be exchanged which have been previously treated accordingly. In other words, the surface-adhesive member may have one component of an adhesive system whose other component is present at the picture. Typical for this type of surface-adhesion are magnetically operative systems wherein say the surface-adhesive member is a permanent magnet and the pictures include a magnetizable component. A further example are pictures which are roughened at their entire face or at individual portions thereof and at which a surface of a surface-adhesive member being designed complementary thereto will engage, such member sliding otherwise across a smooth surface.

If in the following description in a simplified manner a "retentive element" or "adhesive element" is referred to, this means a member which develops a surface adhesion but may be loosened again. As far as in the following text embodiments will be explained, wherein the surface-adhesive member is simultaneously the transporter, no difference will be made between these two designations; however, this difference will be observed in the description of embodiments wherein these two functions are distinctly separate.

Preferably the retentive or adhesive element is a covering disposed on a supporting surface, and any customary application method may be employed therefor.

The retentive covering can be disposed to be effective on the uppermost or bottom-most picture of the pile, both on the housing and on the change-over slider member, or finally on a pressure arrangement if this is provided. The greater the static friction, the less is the pressing force required, which is normally exerted by a spring. When the pressing force is exerted by the pressure arrangement pressing the uppermost picture against the viewing aperture through the pile from below, and the uppermost picture is to be held by the retentive covering, the force must be greater than when the bottom-most picture is to be held.

If a retentive element that has a high coefficient of friction in both directions of movement is used then it is absolutely necessary for the retentive element to be disabled to be disengaged from that particular picture of the pile that is facing it when the slider member is reinserted. This can be brought about by tilting away, pressing away, pushing away or covering up the retentive element such that, for example, its active face is lower than a supporting surface over which the picture is then able to slide. Conversely, the pile may be moved away from the retentive element and the picture brought closer to the retentive element only for the withdrawal of the slider member; finally the retentive element may be turned away from the pile during the return movement.

The disabling is effected automatically as the slider member moves back in and this or the housing or another pressure arrangement will have control elements intended for this purpose.

By using an additional member which may be actuated, for example, by hand, the retentive element can be disabled during the withdrawal of the slider member as well. This facilitates or permits only the exchange of the entire pile of pictures. However, it is preferred that the retentive element that has been disabled during the withdrawal of the slider member may be rendered operative again during the return stroke, thus switching the device over to its picturechange function again.

The device may be provided with further modifications alternatively or in combination, in order to improve its use.

These modifications include pliable support at the back face, means to hand the device as a frame, interchangeable additional frames to be fastened by some means at the front face and having different shapes and surface treatments, the biasing of the slider by means of a spring into its fully opened or fully closed position, the division of the housing wall comprising the window into a multiplicity of windows each one related to a pile of pictures, and another one to a pile of text cards, picture and text eventually being disposed on a common information carrier. Further, the window wall of the housing may be provided with spaces to permit a user to make notes thereon.

Further, there is the possibility to provide a space within the device, preferably stationary, within the housing, to store, e.g., the negative belonging to the photo negative disposed in the slider. Finally, the device may be provided at its front and on its rear face with a window each in which case, of course, two different sliders are mounted in parallel.

Embodiments of the invention are illustrated in the attached drawings. Therein FIGS. 1-70 all relate to embodiments wherein no distinction is made between the separation of the one picture from the pile and the transport function. The figures following in sequence thereafter permit a clearer recognition and distinction of the two steps of the exchange operation and in some of these embodiments individual elements are provided for the separation of the picture by means of the surface-adhesive member and the transport of the picture by means of another member respectively.

BRIEF DESCRIPTION OF DRAWINGS

FIGS. 6-9 are somewhat diagrammatic longitudinal section views similar to FIGS. 2-5 and illustrating the change-over mechanism with a pile of pictures inserted, FIGS. 10-13 are longitudinal section views taken approximately along a center line of FIG. 1 and respectively showing the mechanism in different phases of operation, FIGS. 14-17 are somewhat diagrammatic longitudinal section views similar to FIGS. 10-13 and illustrating a pile of pictures contained in the mechanism, FIG. 18 is a somewhat diagrammatic detail section view taken approximately at 18—18 in FIG. 15, FIG. 19 is an enlarged transverse detail section view and looking in the opposite direction as compared to FIG. 18, FIG. 20 is an enlarged detail perspective view with portions thereof broken away for clarity of detail and illustrating significant portions of the housing seen in FIG. 19, FIGS. 21-26 relate to a second embodiment of the invention and FIG. 21 is a longitudinal section view taken approximately at 21—21 of FIG. 24; FIG. 22 is a longitudinal section view taken approximately at 22—22 of FIG. 24 and showing the mechanism in a different phase of operation, FIG. 23 is a somewhat diagrammatic section view on a horizontal plane immediately below the viewing window, and in the lower half of the figure, the slider is shown diagrammatically withdrawn, and in the upper half of the figure the slider is diagrammatically shown returned into the housing; FIG. 24 is a transverse section view taken approximately at 24—24 in FIG. 21, FIG. 25 is an enlarged detail section view of certain portions of the mechanism, FIGS. 27-30 relate to another embodiment of the invention and FIG. 27 is a longitudinal section view through the apparatus as viewed as 27—27 of FIG. 27a; FIG. 27a is a detail transverse section view taken along a broken line at 27a-27a in FIG. 27; FIGS. 28, 29 and 30 are views similar to FIG. 27, but showing different operational phases, FIGS. 31-36 illustrate a further embodiment of the invention and are longitudinal section views showing somewhat diagrammatically the sequential phases of operation, it being noted that in FIG. 34 a portion of the apparatus is broken away for clarity of detail, FIGS. 40, 43, 44 are detail perspective views of portions of the apparatus, and FIGS. 41 and 42 are enlarged detail section views of portions of the apparatus, FIGS. 45-51 refer to still another embodiment of the invention, FIG. 45 is a detail longitudinal section view through a changer mechanism; FIG. 46 is an enlarged detail perspective view of one of the transporters; FIG. 47 is an enlarged detail section view of the transporter of FIG. 46; FIG. 48 is a detail top plan view of the bottom panel of the slider of FIG. 45; FIGS. 49 and 50 are diagrammatic sketches illustrating the mode of operation of the transporter; FIG. 46a is a detail perspective view of a slightly modified form of transporter; FIG. 47a is a detail elevation view of the transporter of FIG. 46a; FIGS. 49a and 50a are detail diagrammatic sketches illustrating operation of the transporter of FIG. 46a; FIG. 51 is a detail perspective view partly broken away and shown in section of a portion of the changer mechanism;

FIG. 52 is a perspective partly broken away for clarity of detail of the changer; FIG. 53 is a longitudinal section view of the changer of FIG. 52;

FIGS. 55-58 illustrate still another version of the invention wherein the operative and inoperative positions of the retentive element are controlled by a part of the slider which may be displaced relative to another part of the slider in the withdrawal direction of the slider, and FIG. 55 is a longitudinal section view of the mechanism; FIG. 56 is a top plan view thereof; FIG. 57 is a transverse section view thereof; FIG. 58 is an enlarged detail section view thereof in another phase of this operation; and FIGS. 59 and 60 are detail diagrammatic sketches showing a slightly modified design of the retentive element of the embodiment illustrated in FIGS. 55-58, FIGS. 61 and 62 illustrate still another embodiment of the invention and particularly another embodiment of the retentive element which is constructed as two free-running rollers and both of FIGS. 61 and 62 are diagrammatic section views showing this embodiment in different phases of its operation, FIGS. 63-66 illustrate a further embodiment of the invention wherein the retentive element in the form of a free-running roller may be rendered inoperative for the purpose of completely removing the pile, and these views are longitudinal section views of the apparatus in different phases of its operation and wherein FIGS. 65 and 66 have portions broken away for clarity of detail, FIGS. 67-70 illustrate a modified form of the embodiment of FIG. 45 wherein the pile can be completely removed by means of a drawer, and FIG. 67 is a plan view with portions thereof broken away for clarity of detail; FIG. 58 is a top plan view of the same embodiment and showing a different phase of the operation; FIGS. 69 and 70 are longitudinal section views of the same embodiment shown in different phases of operation, and FIG. 69 having portions thereof broken away for clarity of detail, FIGS. 71-76 illustrate another embodiment of the invention, and FIGS. 71-73 are somewhat diagrammatic longitudinal section views showing the picture changer in different phases of operation; FIGS. 74 and 75 are somewhat diagrammatic transverse section views at 74—74 and 75—75 of FIGS. 71 and 72, respectively; and FIG. 76 is a somewhat diagrammatic composite section view at 76—76 of FIG. 71 and showing the slider fully within the housing in the upper portion of the view and showing the slider partly withdrawn from the housing in the lower portion of the view, FIGS. 77-81 illustrate another embodiment of the invention and FIGS. 77 and 78 are transverse section views taken at 77—77 and 78—78 of FIGS. 79 and 80, respectively; and FIGS. 79, 80 and 81 are somewhat diagrammatic longitudinal section views of the picture viewer in various phases of its operation, FIGS. 82-86 illustrate another form of the invention and FIGS. 82, 83, 84 and 85 are somewhat diagrammatic longitudinal section views of the picture viewer in various phases of its operation; and FIG. 86 is an enlarged detail section view, somewhat diagrammatic, of a portion of the picture changing mechanism, FIGS. 87-89 illustrate another embodiment of the invention and are diagrammatic longitudinal section views showing the picture viewer in various phases of its operation, FIGS. 90-95 illustrate another embodiment of the invention and FIGS. 90, 93 and 95 are somewhat diagrammatic longitudinal section views illustrating the picture viewer in various phases of operation; FIG. 91 is a top plan view of the embodiment in the phase of operation illustrated in FIG. 90; FIG. 92 is a detail perspective view of a portion of the picture changing mechanism; and FIG. 94 is a detail elevation view of a portion of the picture changing mechanism, FIGS. 96-101 illustrate another embodiment of the invention and FIGS. 96 and 99-101 are somewhat diagrammatic longitudinal section views of the picture viewer in various phases of operation; FIG. 97 is a top plan view of the picture viewer with portions thereof broken away for illustrating detail; and FIG. 98 is a somewhat diagrammatic detail perspective view of significant portions of the picture changing mechanism, FIGS. 102-105 illustrate another embodiment of the invention and FIGS. 102, 104 and 105 are somewhat diagrammatic longitudinal section views showing the picture viewer in various phases of operation; and FIG. 103 is a detail section view of the viewer and taken on a horizontal plane immediately beneath the top panel of the housing.

DETAILED SPECIFICATION

Figure 1:
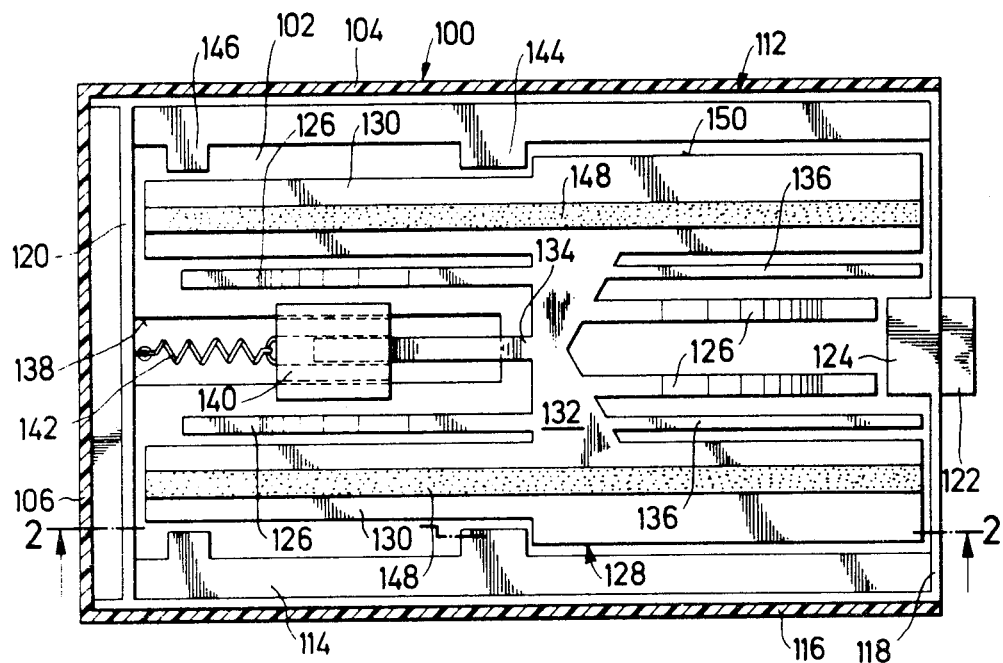
FIG. 1 is a section view taken on a horizontal plane as indicated at 1—1 in FIG. 2, FIGS. 3-5 are longitudinal section views taken approximately at 2—2 in FIG. 1 and showing the change-over mechanism in different phases of operation.

In the form illustrated in FIGS. 1–20, housing 100 and slider member 112 define an enclosure with an interior compartment for the pile 152 of pictures. The housing 100 comprises a base plate 102, side walls 104, a back wall 106 and a lid 108 having a window 110. The slider member 112 movably guided between stops which are constructed in the side walls 104, consists of base bars 114, side bars 116, one front bar 118 and a separator bar 120. A pull 122 for pulling and pushing is shaped on the front bar and a holding-down lug 124, likewise shaped on the front bar, may be recognized.

In the housing there is a pair of springs 126 biassed by arching upwards, one end of each of the springs being anchored in the housing base plate 102 whilst the other end of each spring is able to execute a restricted sliding movement along the base plate. The springs 126 press against the main limb 130 of a pressure plate 128 and urge this upwards; as indicated in FIG. 1, the springs 126 are integral with the pressure plate and the arms of the springs 126 facing the back wall 106 are spaced further apart than the arms facing the front bar 118 of the slider member.

The two main limbs 130 of the pressure plate 128 are joined together by a cross member 132 on which a central limb 134 is shaped. Finally, auxiliary limbs 136 extend additionally from the cross member 132. The function of these elements will be explained in detail later.

In the base plate 102 there is formed a guide 138 parallel to the direction of movement of the slider member, in which guide a button 140 may be moved in a sliding manner. The button 140 is pulled towards the back wall 106 as far as a stop (not shown) by means of a restoring spring 142 and has a central hole into which the central limb 134 of the pressure plate projects in a sliding manner.

Control abutments 144 and 146 are shaped on the lateral bars of the slider member and their function will also be explained later.

On the main limbs 130 of the pressure plate there are finally mounted, e.g. glued, strips 148 of a commercially available plastics material which with only a slight contact pressure exerts an unusually high retentive force.

As will be realized, the pressure plate is intended to hold fast the bottom-most picture of the pile as the slider member is pulled out, while the separator bar takes with it the other pictures. When the slider member is returned, however, the effect of the upward application of pressure by the plate must be considerably reduced. The sequence of operation will be explained first of all with reference to FIGS. 2 to 5, without the pile inserted.

FIG. 2 shows the initial state. The pressure plate lies under the influence of the springs 126 against the window 110 and the lid 108; the separator bar 120 is located between the pressure plate and the back wall 106. If the slider member 112 is now pulled, then the inclined face of the separator bar presses on the edges of the main limbs 130 that are facing it and these move downwards, as the springs 126 yield. The other end edges of the main limbs are, however, as before, pressed upwards. The control abutment 144 thus does not strike the control edge 150 of the main limb 130, which takes the form of a lateral extension thereof, because it slides away beneath the abutment 144. In the end position of the slider member (FIG. 4) the separator bar 120 is pressing the front edges of the main limbs 130 downwards, and because of a "rocking movement" the rearmost edges of the same are correspondingly raised. If the slider member is now pushed in again, then the separator bar presses the pressure plate further down again, but the lowest position of the plate is now near to the front edges, that is to say, nearest the slider member. Therefore, the control abutments 144 now engage over the control edges 150 of the pressure plate and hold this down until the slider member has returned almost to its initial position again where the control elements disengage again and the pressure plate moves rapidly upwards again (cf. FIGS. 1 and 5).

The actual picture change sequence proceeds as follows (FIGS. 6 to 9): To begin with the pressure plate is loaded with a pile 152 of, for example, twenty pictures and therefore lies lower down than illustrated in FIG. 2. As the slider member is pulled out, the separator bar takes with it all the pictures of the pile, since the separator bar "sweeps" over the pressure plate. The bottom-most picture 152' however, against which the retentive covering 148 on the main limbs 130 directly presses from below, is held fast by the retentive covering and remains lying on the pressure plate 128. For the rest, the procedure takes place as described above with reference to FIG. 3. Finally, the slider member reaches its end position shown in FIG. 8, in which the pictures 152 fall at the front onto the base bars 114 of the slider member whilst still lying with their rear edges on the pressure plate. As soon as the separator bar 120 has slid over the ends of the auxiliary limbs 136 that are slightly biassed in an upward direction, the picture 152' that has remained behind is pressed upwards a little by these ends at this (front) edge, so that when the slider member is re-inserted the rear face of the separator bar 120 pushes between the pressure plate and this picture 152' and raises the picture sufficiently far for it to be brought upwards over the upper edge of the separator bar. On further movement of the slider member its separator bar therefore slides below the picture 152' that positions itself in the final position as the uppermost picture on the pile 150. The insertion of the pile is thereby not hindered by the retentive covering 148 since, as mentioned above, the pressure plate is held down by the control elements 144, 150.

If the entire pile is to be removed, then the button 140 is displaced towards the front. As apparent from FIGS. 10 to 13, the central limb 134 of the pressure plate is downwardly curved so that an S-shape, which is straight when viewed from above, is produced, the lower end of which projects into the button. If the button is displaced out of the position shown in FIG. 10 into the position shown in FIG. 11, then it presses on the upper inclined face 154 of the central limb 134 and pulls the complete pressure plate 128 down against the force of the springs 126, and in fact pulls down until the upper side of the retentive covering 148 is lower than the surface of the base bar 114 of the slider member 112. Thus, when the slider member is pulled out, the entire pile 150 is taken with it, as the pile now lies on the slider member itself. As a result of the biassing of the springs 126 and the friction contact of the central limb 134 in the button 140, the button is not pulled back by the spring 142 which is weak in comparison. However, when the control abutment 146 strikes with its sloping control face 156 on the control edge 150, the pressure plate is pressed down even further and in this manner terminates the clamping between the button 140 and the central limb 134 so that the button is pulled by the spring 142 into its rest position (FIG. 12). Nevertheless, the control abutment 146 holds the pressure plate below the level of the base bars of the slider member so that the pile can be pulled out unimpeded to its full extent. Near to the end of the path of movement the control abutment 146 releases the control edge 150 again; the springs 126 are able to press the pressure plate upwards again at its rear edge whilst at the front it is still held down by the separator 120.

From the above explanations the sequence can be followed again with reference to FIGS. 14 to 17 when a complete pile is to be removed; the positions of the slider member according to FIGS. 14 to 17 are analogous to those of FIGS. 10 to 13.

FIG. 18 shows once again the relative positions of the base bars 114 on the one hand, and the pressure plate 128 on the other hand when the button is in the removal position.

In principle, it would also be possible to return the button into the rest position by means of a control member (not shown) simply during the return of the slider member. However, it may be seen that in the embodiment illustrated there is the advantage that by holding the button firmly in the removal position, the device can be held permanently ready for the removal operation, which is significant when the device is to be stored in a stacking frame.

The operations that are effected by the pressure plate will now be summarised once again.

During picture change-over, the pressure plate is always held straight with the "line" (transversely to the movement of the slider member) adjacent to the bottom-most picture, where the separator runs over. The picture to be retained is consequently clamped reliably where necessary. During the return of the slider member on the other hand the control elements 144 to 150 hold the pressure plate below the level of the base bars of the slider member (or other support means, e.g. on the base plate of the housing) so that the retentive covering 148 does not touch the underside of the pictures.

During the change-over of the pile the pressure plate is brought into the same position as during the change-over return stroke but by means of a button that can be actuated separately. This can be held permanently in the position in which the pile can be changed, but springs back automatically without further manipulation into picture change-over position. It will be seen that in this manner the device is fool-proof.

The pressure plate is so constructed that it also reliably holds fast badly curved pictures and permits the change-over and removal procedure to take place. In order to deal with such "bent" pictures, however, a series of further features is provided in order to prevent incorrect operation.

Pictures that are curved downwards about the transverse axis—at right angles to the direction of movement of the slider member—could lead during the picture change to the top-most or a few of the upper pictures not being pushed back by the end wall 118 of the slider member but being jammed between the end wall of the slider member and the lid of the housing. For this reason the holding-down lug 124 is provided, beneath which the pictures can be snapped as they are inserted; further possibilities are discussed below.

Pictures that are curved in a reverse direction would not be able to allow the passage of the separator during the change-over process, but would push against this. In this case an especially low-friction material may be used for the separator, and instead of manufacturing the complete slider member in one piece in an injection-moulding process, the separator can be attached as a separate part.

Pictures which arch downwards about the longitudinal axis could admittedly lie laterally on the base bars of the slider member during the return stroke of the slider member and in this way remain clear of the retentive covering of the pressure plate, but would push centrally onto the facing edge of the central limbs 132 of the pressure plate. For this reason the relevant edge interrupted by the springs 126 and the auxiliary members 136 is designed to converge to a point, as apparent from FIG. 1. A reverse arching of the pictures would not lead to any disruptions.

Although the pictures must, of course, lie freely in the slider member, disruptions might occur if the pictures were to lie crookedly. For this reason stop projections 160 and 162 which project from below and from above, respectively, are shaped on the back wall 106 and project to such an extent that they extend into recesses 164 and 166 of the separator 120 when this is in its inner end position (FIG. 19). In this position one projection 160 in each case near to the lateral walls of the housing projects downwards from the lid thereof towards the interior and further inside a projection 162 projects upwards from the base plate towards the interior. In the direction in which the slider member is pulled out the projection is aligned with one of the retentive coverings 148, with the result that the corresponding recess 166 of the separator itself ensures that the separator cannot touch the retentive coverings. A further recess 168, which is formed in the slider member from above leaves room for the passage of holding-down cams 170 which project downwards from the lid and may be more clearly seen in FIG. 20, whilst they have been omitted from the other Figures in order to keep these clear. Their function is to press down the uppermost picture so far below the upper edge of the separator when the slider member has been inserted, as to make certain that the slider member takes with it the uppermost picture. Similar holding-down cams that extend further down and are likewise indicated best in FIG. 20 are located near to the front edge of the lid; they have the function of pressing the pile pulled out during the change-over so far below the level of the lower side of the picture 152' lying on the pressure plate that the sliding movement of the picture 152' over the separator is effected as far as possible without any hindrance. In FIG. 19, the upper sides of the pictures are indicated below the cams 170 and 172 by broken lines 170' and 172'.

Finally, it is also apparent from FIG. 19, in which, however, this effect has been considerably exaggerated, how the picture held fast on the retentive coverings 148 is stressed by the separator 120 and thereby held so that it clings reliably.

The exact profile of the separator in the transverse direction depends on the type of pictures to be formed into a pile, on the choice of material and other components. A compromise must be made here between the space requirement occasioned by the necessarily inclined attitude of the separator, along which the pressure plate edge must slide at the slider member end, and the firmly held picture must slide at the other end, and an optimum inclination for these faces. For fairly smooth plastics material an angle of about 45° to 60° has proved successful, although this angle need not be constant, as indicated only schematically in FIGS. 2 to 17, but may also vary along the inclined faces or may be different from one face to the other.

The retentive covering is especially advantageous as a transporter when for some reason or other, for example for particularly careful treatment of extremely thin pictures, the planar pressure exerted on the pictures is to be only slight, since despite this the retentive element holds the pictures fast in a reliable manner, as experience has shown. Such a device is shown in FIGS. 21 to 26.

FIG. 21 shows a housing 201 having a base plate 220, a viewing window 222, side walls 224 (FIG. 23) and a detachable lid 202 which is shown detached from the housing in FIG. 22. The slider member 203 having a base plate 226, lateral bars 228 and a front bar 230, is slidably mounted in the housing. The separator 204 is fixed in the housing by arranging it between two lugs 212 which project downwards from the top of the housing. The cross-sectional shape of the separator is best illustrated in FIGS. 21 and 22.

There extends centrally along the slider member a transporter arrangement consisting of a leaf spring 210 on which a retentive covering 232 is arranged at least at the end close to the lid 202. The lateral bars 228 of the slider member are guided between the lugs 212 and the side walls 224 of the housing.

In two vertical members 211 close to the side walls 224 and the lid 202 of the housing in each case a downwardly projecting end portion of a wire spring 206 is accommodated which spring is curved in the shape of a bow towards the middle of the housing, and its other, likewise downwardly curved, end 207 is loosely accommodated in a slot 234 which is provided between the lateral bar 228 of the slider member and the side wall 224 of the housing. A projection 209, projecting outwards up to the side wall 224, is formed on the rear end, that is to say, the end facing the lid 202, of the slider member lateral bars.

The lid 202 can be fixed to the housing 201, for example, by studs 205.

It is assumed that a single picture 208 lies between the viewing window 222 and the spring bows 206. A pile of pictures (not shown) is arranged in the housing between the transporter 210 of its retentive covering 232 and the underside of the spring bows 206. If the slider member 203 is now pulled, the pile is held back in the housing by the separator 204, but not the bottom-most picture to which the retentive covering 232 is adjacent. This picture is moved outwards by the slider member and during this movement slides beneath the separator 204. As shown in FIG. 24, the separator is in two parts so that the central region of the device remains empty and consequently the transporter arrangement can pass between the two parts of the separator. When the projections 209 strike the freely movable arms 207 of the springs 206 these are drawn outwards, the spring bows being straightened. The single picture 208 which was hitherto disposed on the spring bows is therefore no longer supported and can fall downwards. It thus falls, as the uppermost picture, onto the pile held back by the separator.

The transporter 210 has as a support for the retentive covering 232 a spring 236 that is slightly biassed in an upward direction, the contact pressure of which is just adequate to take along a single picture. In the fully withdrawn position of the slider member (FIG. 22), small auxiliary springs (not shown) beside the retentive covering only in the middle of the spring 236 press the edge of the transported picture that is nearer the separator slightly upwards so that when the slider member is pushed back in, this edge slides upwards along the outwardly facing inclined face of the separator and is thus placed on the spring bows 206 which when the slider member is returned are forced inwards again on account of the inherent resilience of the springs 206.

During the return movement of the slider member, the transporter must slide away beneath the pile disposed in the housing. Although the bias of the spring 236 is very weak, this return movement can nevertheless be difficult if the retentive covering 232 slides along on the bottom-most picture. For this reason provision is made for the spring to be pressed down during the return movement. In FIG. 26 the rearmost end 238 of the leaf spring 236 which, in the region of this end, is made slightly more pliable than the rest of the spring by reducing the cross-section or the like, is shown. This portion of weakened cross-section has only in the region of its front edge laterally projecting guide members 240 (see also FIG. 25) and from the base 220 of the housing two cam bars 213 having inwardly facing guide edges 242 project upwards. The base 226 of the slider member is cut away in the region of these cam bars 213.

When the slider member is drawn out, the end portion 238 passes under the separator 204 and is pressed downwards by the latter so that the guide members 240, on pushing the slider member back in, pass under the guide edges 242 and thus press the retentive covering 232 below the upper side 244 of the cam bars 213. The cam bars 213 may be of such a length that the spring 236 is not released again until close to the inner end position of the slider member where it places the retentive covering 232 from below against the now bottom-most picture of the pile.

To remove the pile, the lid 202 is opened and the pile is shaken out, the picture 208 lying at the top also falling out. So that the bottom-most picture of the pile is not held fast by the retentive covering 232 or does not have to be drawn out of the device with great effort, the retentive covering can be disabled by opening the lid 202 by, for example, the spring 236 being drawn below the level of the cam bars. For this purpose, a system of rods, for example, may be coupled up to the lid 202.

FIGS. 27 to 30 show only the elements of the embodiment that are important for the operation thereof.

In the housing 300 a control guide groove 302 is formed in each of the two side walls 301, in which guide groove the laterally projecting free ends 304 of a doubly cranked wire bow 303 engage slidably. On the underside of these ends 304 there are arranged retentive elements 305. If the extreme portion 306 of the bow which projects forwards out of the housing 300 is pulled, then the ends 304 of the bow slide first of all parallel to the pile of pictures 308, are then guided downwards by the guide groove 302 and finally, when the retentive element 305 meets the uppermost picture, press the pile downwards against the force of a spring arrangement 309. The ends 304 of the bow with the retentive covering 305 then draw the uppermost picture of the pile through a housing aperture 310 to the outside, but the rear edge of the picture remains clamped between the retentive element 305 and the pile or a separator 311 and cannot, therefore, drop out. After the separator the picture runs on to an auxiliary spring 312 and if the bow 303 is now pushed in again, it is guided along the following downwardly sloping portion of the guide groove beneath the separator 311 on top of the pressure arrangement 309, but below the pile 308. On the upper side of the ends 304 of the bow there is no retentive covering so that this is able to slide with a very low friction beneath the pile (FIG. 30). A button 315 permits, as in FIGS. 1–20, inactivation of pressure asembly 309 when the pile 308 is to be extracted via, say, a lid-closed aperture opposite separator 311.

FIG. 27a is a schematic cross section and reveals the arrangement of the bow in the guide groove in the housing.

The slider member is in this case only an operating bow and could, if desired, even be replaced by a know projecting laterally out of the housing.

FIGS. 31 to 36 relate to a further form of embodiment. Here, the slider member 400 may be pulled out relative to the housing 402 but the slider member pull 404 can also be moved relative to the slider member itself. The pull 404 as a pulling member is hinged at 406 on a lever 412 pivoted on the base 408 of the slider member at 410. At its other end, the lever 412 is hinged to a pressure and transporter plate 414. In the rest state (FIG. 31) the plate 414 lies beneath the base bars 416 of the slider member. When the pull is moved the lever 412 moves upright, in so doing lifts the plate 414 above these base bars and finally pushes the pile upwards as far as it will go. As a result, further relative movement between the pull and the slider member is prevented and if the slider pull is pulled further the entire slider member comes out. When re-inserted the pile is lowered by pivoting the lever so that the retentive element lies disabled beneath the base bars.

FIG. 36 shows a variation with two levers 412' instead of the one lever 412.

Figure 37:
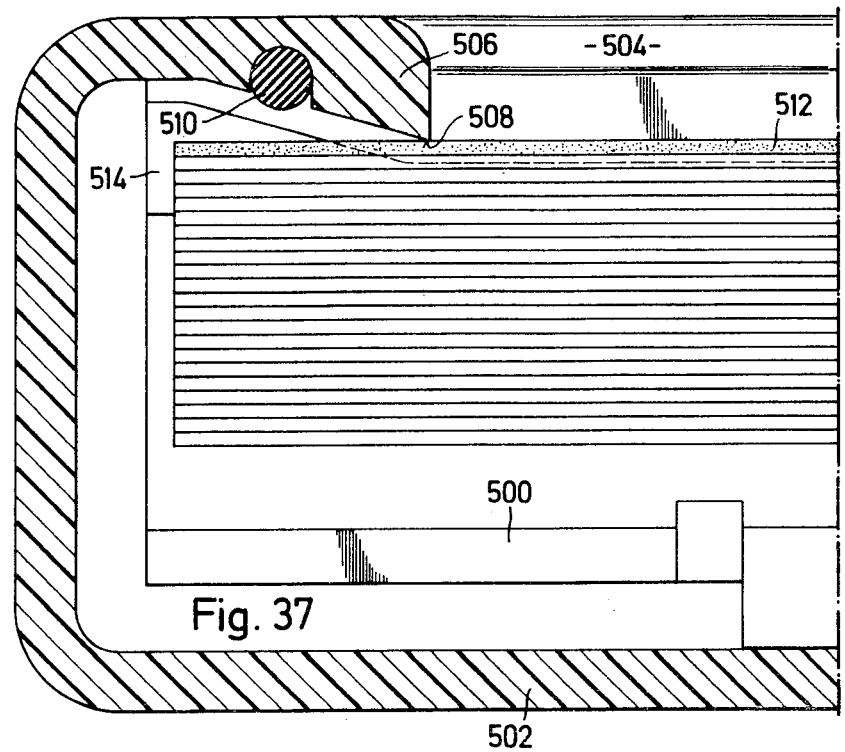
FIGS. 37 and 38 show a still further embodiment of the invention and are enlarged detail transverse section views through the apparatus.
Figure 38:
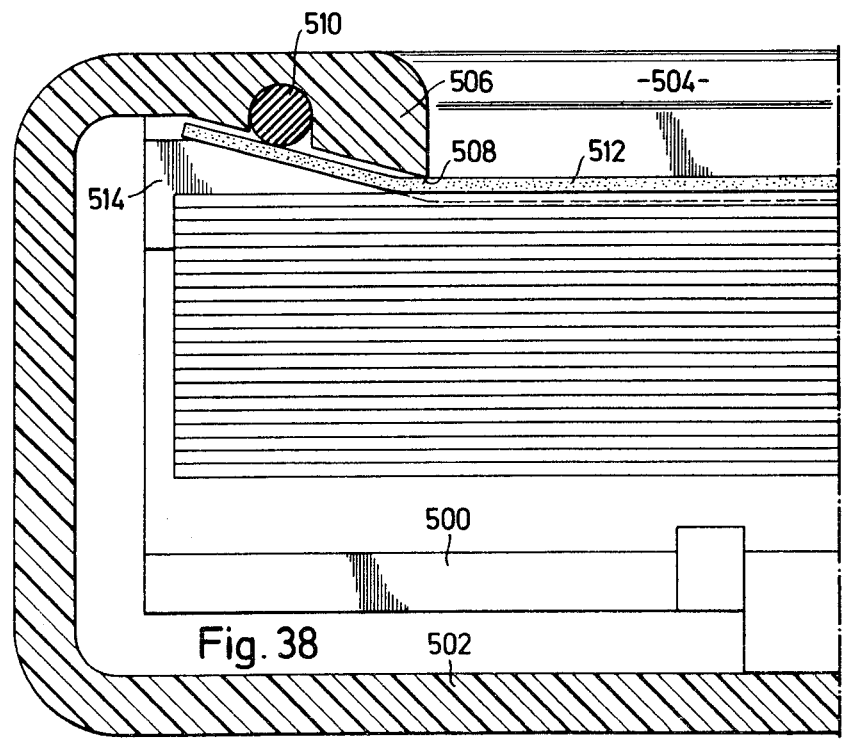

FIGS. 37 and 38 show in cross-section the initial position and the transporting position for the last embodiment. As usual, the slider member 500 is guided in a sliding manner in the housing 502. On the underside of the frame portion 506 of the housing surrounding the viewing aperture 504 there is arranged the retentive element 510 recessed relative to one edge 508 of the frame pressing the pile of pictures downwards, so that it does not, therefore, engage with the uppermost picture in the rest state. When the withdrawal of the slider member commences, the uppermost picture 512 is lifted by an auxiliary device (not shown) at its edges until it comes into contact with the retentive element 510, after which the separator 514 which is constructed to be complementary with the frame section 506, clamps this picture against the separator so that it remains behind in the housing while the pile is removed to the outside by the slider member 500 (FIG. 38).

Figure 39:
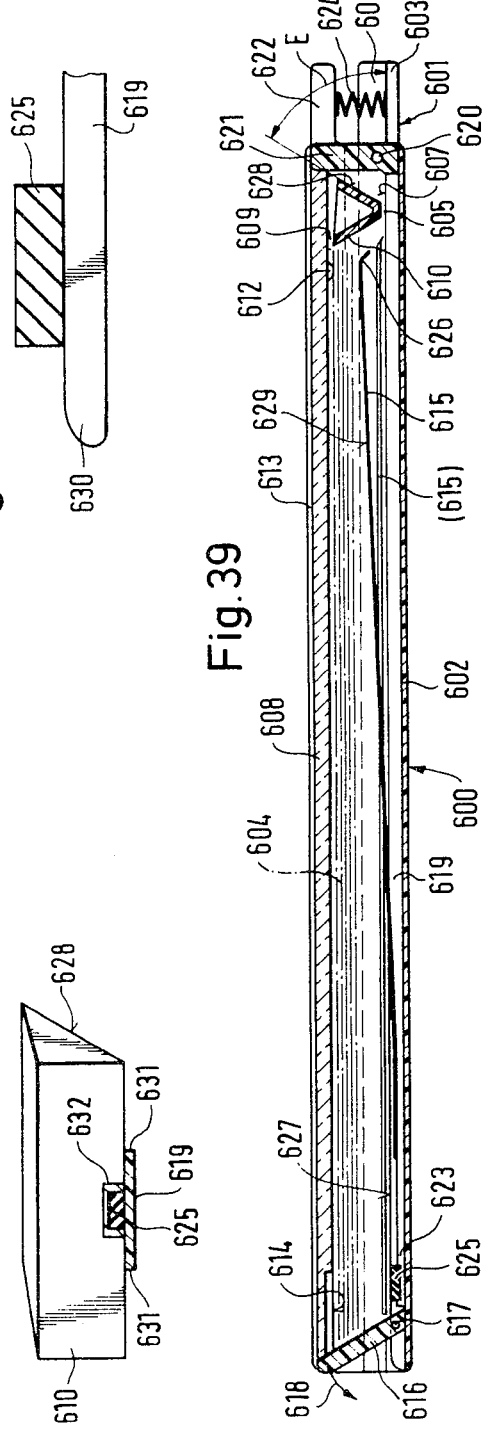

FIG. 39 shows in longitudinal section in a schematic manner an embodiment wherein upon the pulling of slider 601 the transport function is actuated separately.

Slider 601 may be pulled out of housing 602 and only a short portion of the slider will remain in the housing. The slider has guide members 603 which extend almost or completely along the entire slider 602 in the direction of its movement. These guide members have guide surfaces at their outer face by which they are guided along the inner face of the housing bottom and/or along the housing side wall. These guide members have preferably the angular profile shape indicated in FIG. 39, so that they exhibit at their inner side first transport surfaces 607 upon which the bottom face of a picture will slide as the picture is removed from pile 604 via removal slot 605. Moreover, the guide members 603 have second guide surfaces 606 at their inner side extending perpendicularly with respect to said first guide surface 607 and forming lateral abutments for the removed picture by which it is retained against lateral falling off from slider 601. These second guiding surfaces 606 need not extend over the entire height of the slider but may be supplemented by lateral stop faces (not shown) extending up to the housing lid 608 or are integrally formed therewith. These supplementary lateral guide surfaces need not extend as said above for the other guide surfaces over the entire length of the slider, it will be sufficient if they are provided at several places, the position thereof being selected such that a removed picture will safely held in slider 601 and is prevented against falling off prior to its being returned again via inlet slot 609 above separator 610 unto the pile of pictures.

Housing lid 608 is formed by a transparent plate and rigidly connected to the remainder of slider 601 thus forming a portion thereof.

The removal slot 605 is limited at the bottom by the first guide surface 607 while it is defined at the top by the outer side of the apex of separator 610 whose section is V-shaped. In a similar manner the return slot 609 is defined on the one hand by a movable element, namely the inner face of the housing lid 608 and on the other hand by a stationary surface, namely the upper end of the left portion of separator 610 in FIG. 39.

One or several separating stops 612 are disposed at a guide 613 wherein housing lid 608 is guided. With the housing lid removed, the picture pile is retained by surfaces 614, engaging over the edge of the uppermost picture in the pile facing upwardly or away from the separator. These surfaces 614 serve as retention members because they hold down the picture pile against the pressure against spring 615. The retainer surfaces 614 are formed integrally with a flap 616 the inner side of which engages the edges of the pictures in the pile. Flap 616 may be pivoted about an axis 617 in the direction of arrow 618 from the operative position as shown, releasing thereby a locking system not shown in detail, so that the pile may be easily removed with the slider 601 pulled out. Axis 617 extends parallel to removal slot 605. The flap 616 acts as a pivotable wedge because it engages like such a tool under the facing edge of the picture pile upon being pivoted.

In the bottom area of the slider 601 a lever 619 is journalled pivotable about a pin 620. The latter is disposed in the leading portion of the slider and adjacent this pin the lever 619 is formed as an upright elbow lever 621. Preferably the lever and the elbow lever 621 are integral. The lever arm 622 opposite lever 619 serves as a pressure lever because finger pressure acting thereon will pivot the lever 619 from its rest position wherein its free end 623 is disengaged from the picture pile by action of a spring 624, and into a transport position. In this transport position an adhesive transporter 625 disposed at the free end 623 of lever 619 will swing upwardly and engage the trailing edge of the bottom picture in the pile and will transport it upon moving of slider 601 so that the picture will leave the housing via removal slot 605. Leaf spring 615 will serve as a separating stop within leading end 626. The inner most end of spring 615 is fastened to lever 619 adjacent the free end thereof. Upon pivoting of the lever into its engagements position, therefore, this fastened end of spring 615 is moved upwardly while its free end adjacent the lever bearing goes downwardly. This position is indicated in the drawings with (615). In the rest position or inactive position or disengagement position of the lever the picture pile may rest upon bar 627 at the side of the housing. The slider 601 may be pushed under the pile again without bulging of the lower most pictures, provided of course, that no pressure anymore will act upon lever arm 622. Alternatively or additionally the lever including the member 625 may be lower than the bottom of slider 601 which even in the fully extracted position will engage with its inner end beneath the picture pile and thus prevent that the transporter upon return stroke of the slight will get in touch with the lower most picture.

The adhesive member 625 may be designed as a rubber strip, small suction cup, as a roller with one-way feature or in an equivalent manner. It is guided by the outwardly facing surface 628 of the right hand portion (FIG. 39) of the separator which defines an uplike angle E with the first guide faces 607 upon return stroke of slider 601 into housing 600 beneath the removal slot 605 and for example into an indentation in the bottom portion of the slider or into the free space between separator 610 and the guide member 603. Since the pressure upon pressure lever 622 is removed prior to the return stroke of slider 601, the leading end 623 of the lever will come into said indentation or the said free space under the action of bias spring 624.

It may mentioned that spring 615 generally has the function of a pressure assembly to urge the picture pile against the housing lid.

Spring 615 may in the embodiments of FIG. 39 be a leaf spring of plastic or metallic material. In order to assure a uniform urging of the pile toward the inner side of the transparent lid 608, instead of spring 615 four lever arms may be disposed along the longitudinal center of lever 619 extending under upright angles to the longitudinal direction of the lever and upwardly so that they urge the pile upwards against lid 608 and support the pile uniformly. The embodiment, however, may be designed such that springs may be provided on the housing and at the sides of slider 601 which urge the pile upwardly, to complement or replace the elbow 629 of spring 615 which likewise serves as a stop. In such a design eventually spring 615 may be done away with completely.

Further it may be mentioned that embodiment of FIG. 39 may be designed such that it will provide the exchange operation of the pile in reverse manner in that the pictures are pulled from the pile by means of a lever disposed now in the lid 608 whereafter they are added to the pile at the lower end thereof again.

Figure 40:
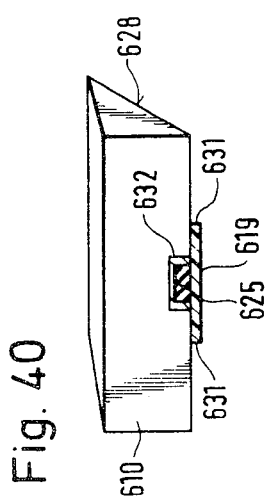

In an alternative embodiment illustrated in FIG. 40 similar means are provided as found in FIG. 39, except the features described hereunder. In this embodiment the spring 624 is disposed and/or designed such that it usually will urge and bias lever 619 with its distal end upwardly thus it being activated permanently. This will result in fully automatic operation for the transporter 625, normally engaging the lower most picture in the pile so that it will take with it upon pulling of slider 603, the bottom most picture without any further actuation of the lever manually or otherwise. When the removed picture has been transferred completely to slider 601, transporter 625 still urges the picture upwardly under the action of spring 624 so that upon driving slider 601 into housing 600 the picture will pass through return slit 609 while the transporter 625 first pushed downwardly by surface 628 from its upper position thereby overcoming the bias of spring 624 and passes through an indentation or notch 632 in the separator 610. Suitable stops at the trailing end of slider 601 (in return direction) pushed the edge of the individual picture into the housing after transporter 625 is disengaged from the picture. FIG. 40 shows isometrically from the inside how the transporter passes under separator 610.

From the foregoing explanation of the alternative embodiment it will be understood that a manually operated pressure lever, such as lever 622 in FIG. 39, will not be necessary anymore, because solely the reciprocation of the slider will suffice for operation. The bias spring for the lever may be provided in this case as a compression spring under the lever for example. Similar to the embodiment of FIG. 39, the embodiment of FIG. 40 may be modified such that the transporter act upon the upper face of the pile so that the pictures are taken off at the top side and return at the bottom side of the pile.

Figure 41:
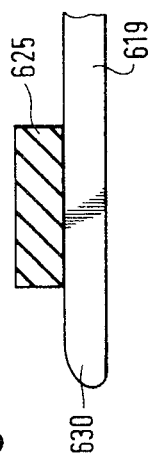
FIGS. 39-44 illustrate a still further modification of the invention and FIG. 39 is a longitudinal section view through a changer apparatus.

To facilitate the reintroduction of lever 619 of embodiment in FIG. 39 its leading end 630 may be rounded and may protrude with respect to the transporter 625 in return direction of slider 601 so that the transporter may not engage the inclined front face 628 of separator 610 (FIG. 41). Further lever 619 has at its distal end lateral edges and protuberances 631 lateral with respect to the transporter 625, said protuberances 631 sliding over the downward facing edge of the separator which is provided with an indentation 632 dimensioned such that the transporter 625 will not even touch the separator.

Figure 42:
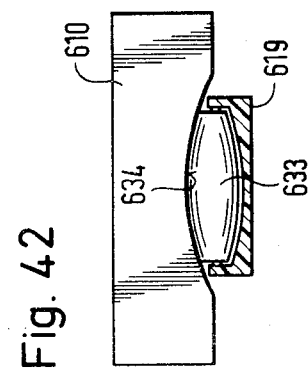

Alternatively and as shown in FIG. 42 the transporter may be designed as a roller 633 with one-way function, i.e. the roller 633 is braked and does not revolve during pulling of the slider but is rotatable during the return stroke and engages with very little friction the facing surface 634 of a respective indentation in the central area of separator 610.

Figure 44:
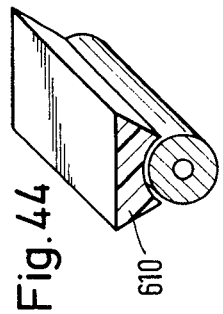
Figure 43:
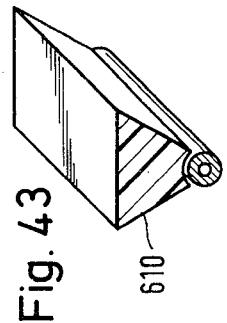

Further possibilities to facilitate introduction of lever 619 are illustrated in FIGS. 43 and 44. Therein the lower portion of separator 610 is designed as a freely rotatable roller of optional diameter, rotated by transporter 625 during its return stroke into housing 600.

FIGS. 45 to 51 illustrate a further embodiment similar to FIG. 39 and only the modifications will be explained. Lever 619 and spring 615 are replaced by leaf springs 711 at the bottom of slider 601. At the distal ends of said springs, each has a lip 714 consisting of an adhesive material as for example rubber. The lips have a thin ends 715 bending during pulling of the slider about the upper edges 716 of springs 711 thus assisting to the action of each spring 711 by forming an adhesive end thereof during pulling of the slider which will provide a perfect bonding with a minimum of slipping (FIG. 49). On the contrary upon the return stroke the leading end of lip 715 (FIG. 50) is bent to the right and slips across the picture which is supported by the front edge 716 of leaf spring 711.

In FIGS. 49 and 50 arrow 717 indicates the direction of pulling of slider 712 while arrow 718 indicates the return direction. In FIG. 49 the bending of lip 714 about the upper edge 716 of spring 711 is shown while FIG. 50 indicates that upon return of the slider 712 the front end 716 of spring 711 engages respective pictures 719 and the lip 714 slips across the bottom face of picture 719.

This lip acts automatically and activates and inactivates itself. In comparison to a transport roller as described later, it has the advantage to be very flat so that the housing may have a height only slightly exceeding that of the pile regardless of the cost of manufacture of such lips being very economic. The two springs 711 moreover urge a picture removed from the pile to the level of the insert slit as indicated in FIG. 45.

FIG. 48 is a plan view of springs 711 and it will be recognized that the springs 711 may be stamped as tongues of a leaf spring 720 which in turn is mounted in the slider bottom or in general in the bottom portion of the slider.

FIGS. 46 and 47 show the shape of spring 711.

Lip 714 must in its initial shape extend in front of the edge of spring 711 but must simultaneously be very resilient so that it may yield during the return stroke of the slider into the housing to permit the main bias of spring 711 to act upon the pile. A tongue 711a stamped from the free end of spring 711 serves to clamp the bottom end of the lip and is shorter than the upper portion 711b of spring 711, this difference in length being dependant upon the material of which the lip 714 is made. In other words, the bias of the adhesive material of which the lip 714 is made, must be small relative to that of the supporting spring 711. During the slider return stroke into the housing, the greater force of the supporting spring 711 will overcome so that the friction of the leading end 715 of the lip is greatly reduced, and the supporting action of spring 711 exists substantially between the metal of the spring and the picture material. The spring end is rounded indicated at 716 so that the leading end 715 of the lip 714 will not be cut due to the reciprocating movement. FIGS. 46a, 47a, 49a and 50a indicate analog to FIGS. 46, 47, 49 and 50 respectively a design of spring 711 wherein a pair of skids 700 are provided at the sides of lip 111. The thin lip end 715 will be bent beneath the skids and the engaged picture will upon the return stroke be supported upon the skids.

The return stop 728 is provided in the embodiment of FIG. 45 at the trailing end (in pulling direction of the slider) of the housing lid 713 which is fixed to the slider. Since this stop will be at the left end of the housing in FIG. 45 prior to the pulling of the slider, additional stops 721 are provided at the edge 722 of the housing and adjacent at the return slit as shown in FIG. 51. The additional stops 722 keeping the pictures of the pile, whose edges lie beneath the edge 722 of the housing, downward away from the panel 713 such that during the pulling of slider 712, no picture will be pulled out via the return slit.

Figure 52:
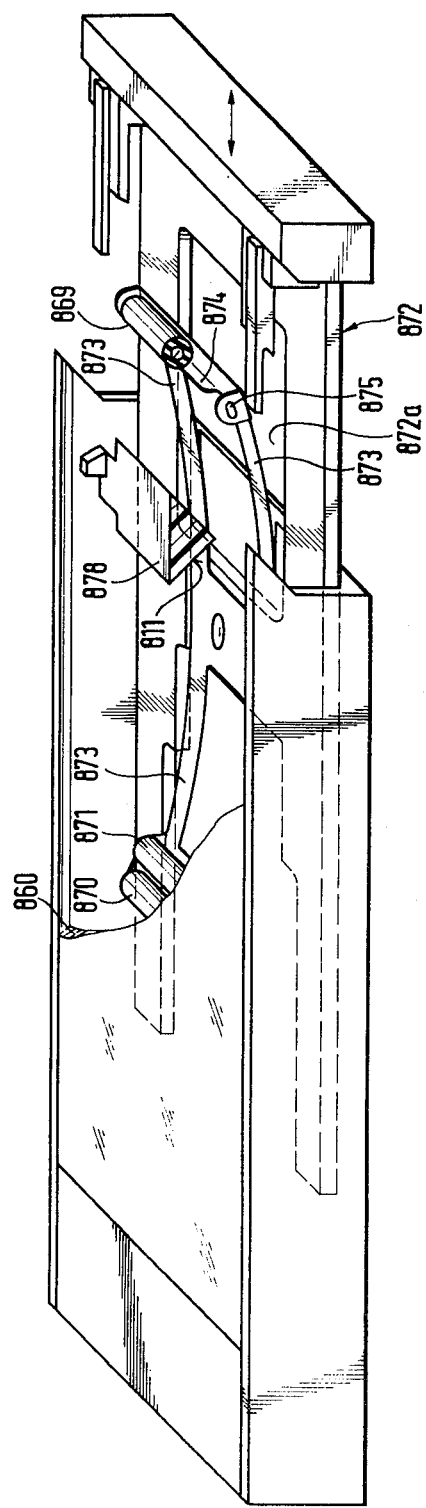
FIGS. 52 and 53 illustrate still another embodiment of the invention.
Figure 53:
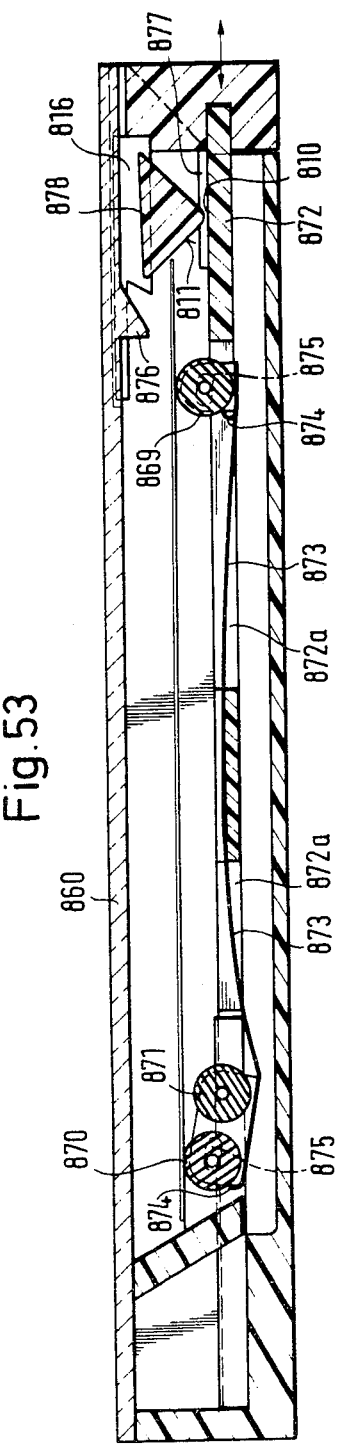

FIG. 52 illustrates isometrically without picture pile a further embodiment; and FIG. 53 illustrates a longitudinal section in the inserted position.

Again the pile is urged resiliently upwards, for this purpose, however, spring arms 873 being mounted on slider 872. The arms carry rollers 869, 870 and 871. These rollers 869, 870 urge the picture pile against the transparent housing lid 860. The rollers are braked against rotation by stop edges 874 during the removal of a picture from the pile so that the respective picture will be pushed through the removal slot due to the friction between the rollers and the picture. During the return of the removed picture to the pile, the rollers 869, 870 move along slots 875 and move away from the stop edges 874 and may freely rotate so that they may freely roll under the separator 878 having a picture edge stop surface 811. Slider 872 has an indentation 872a in the bottom part of the slider into which the spring arms and rollers recede.

These rollers 869, 870 further serve the purpose to urge the picture which has been removed through the removal slot 810 upwardly so that it is lifted to the level of the return slot 816.

The leading roller 870 is supplemented by a roller 871 provided in a trailing position so that there will be a twin roller system. This has the effect that the free wheel roller 870, once it has passed the separator 878 during the return stroke, will not be urged upwardly too early, as to prevent closing the return slit 816 by lifting the pile. This difficulty cannot be done away with by repositioning of the roller 870 to the right in FIG. 53 because in this case the pictures could not be removed anymore completely from the pile.

In this design the picture is simply held by preferably transparent tongues 867 extending at the upper right hand edge and perhaps lateral stop surfaces 877 prevent the picture from laterally falling off. Only at these points portions of the pictures are retained.

Figure 54:
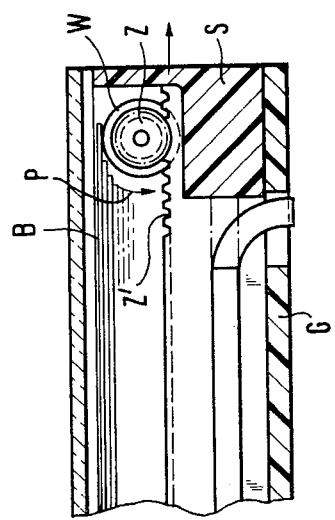
FIG. 54 is an enlarged detail section view showing a modified form of the separator of FIGS. 52 and 53.

FIG. 54 shows substantially schematically another design of the separator. A smooth cylinder W is rotatable in housing G. The cylinder is laterally provided with a toothed gear Z engaging a toothed rack Z moving with the slider S. The uppermost picture B of the pile is to be exchanged in the design. Upon pulling of the slider cylinder W will be driven in direction of arrow P so that the cylinder surface urges the adjacent edges of the remaining pile downwardly while the upper most picture B is moved by a transporter. During the return stroke a free wheel system (not shown) between gear Z and cylinder W allows cylinder W to remain stationary without pushing out a picture from the top of the pile. Alternatively cylinder W may be designed without free wheel system which would assist the pushing in of the removed picture under the pile but in this case the uppermost picture would have to be kept by means not shown.

An expert skilled in the art will be able to provide this type of separator readily to embodiments wherein the lowermost instead the uppermost picture is to be removed or to embodiments where the separator is disposed at the slider.

FIGS. 55 to 60 show two embodiments in which the retentive element can be rendered operative or inoperative as a result of a relative movement between two parts of the slider member. In detail, FIGS. 55 and 58 show longitudinal sections through this embodiment, with the slider member in different positions, whilst FIG. 56 shows a plan view of the embodiment and FIG. 57 shows a cross-section through this embodiment; FIGS. 59 and 60 show a retentive element that has been modified compared with that shown in FIGS. 55 to 58.

The retentive element 901 is accommodated in a recess 902 in the lid 903 of the slider member which is denoted generally by the reference 904. This retentive element 901 is a rubber strip arched in a slightly convex manner towards the pile of sheets 905. At its end 906 which is at the front when viewed in the direction in which the slider member is pulled out, the rubber strip is fixed to the slider member lid 903, whilst its rear end 907 is movable relative to the housing lid 903 and is connected to a rod 908.

In the inoperative position of the retentive element 901 its convex portion still lies within the recess 902, so that it cannot engage with the uppermost sheet of the pile 905, as seen in FIG. 55. If as a result of pulling the rod 908 the rear end 907 is pulled towards the front end 906, the convex portion of the retentive element 901 arches outwards, emerges from the recess 902 and positions itself against the uppermost sheet of the pile 905, as seen in FIG. 58.

To control this movement of the retentive element 901 from its inoperative position into its operative position and back again, the slider member 904 consists of two parts 909 and 910, which may be displaced relative to one another in the direction in which the slider member is pulled out. These two parts are a part 909 which is at the rear when viewed in the direction in which the slider member is pulled out and which forms the main part of the slider member 904, and a part 910, which is at the front when viewed in the direction in which the slider member is pulled out and which is displaceably mounted in the first part 909. The front end 911 of the rod 908 is secured to the front part 910.

When the slider member 904 is pulled out of its housing, in which operation the front part 910 of the slider member is laterally gripped, owing to the frictional resistance which the rear part 909 of the slider member encounters from the housing, initially only the front part 910 of the slider member is moved until the retentive element 901 has pressed so far onto the uppermost sheet of the pile 905 that a further movement of the slider member part 910 relative to the slider member part 909 is no longer possible; the resistance to a further deformation that the retentive element encounters from the uppermost sheet on the pile 905 acts to some extent as a stop which limits the relative movement of the two slider member parts away from one another. The two slider member parts 909 and 910 now move jointly because the uppermost sheet on the pile 905 is carried along and pulled out of the housing in which the slider member is located. As the slider member is re-inserted, again first of all only the front part 910 of the slider member moves, as a result of which the retentive element 901 is extended again so that it disappears completely into the recess 902 and cannot engage with the pile 905 in a disruptive manner. This movement of the front part 910 of the slider member is limited by a stop 912 that is provided on the front part and co-operates with a counter-stop 913 on the rear part 909 of the slider member.

It should be pointed out that the separation between the two slider member parts can also be made, of course, in the rear region of the slider member, for instance in such a manner that the rear end 907 of the retentive element 901 is attached to one part of the slider member and the front end 906 is attached to the other part of the slider member, and the pulling force for pulling the slider member out of the housing 914 and the pressure for re-inserting the slider member into the housing is exerted by way of a joining element which acts on that part of the slider member to which the end 907 is fastened. In all cases it is essential that the retentive element is automatically controlled by the movement of the slider member, in that upon every movement of the slider member initially only a first part of the slider member is moved, which part brings the retentive element from its inoperative into its operative position or vice versa and only thereafter is the second part of the slider member moved along with it.

As FIGS. 59 and 60 show, a retentive element 915 which is attached to a small block 916 may also be used. The small block 916 can be moved by the rod 908 along an inclined face 917 that is provided in a recess 918 in the housing lid 903 and out of and into this recess 918, so that in principle the same operation as explained with reference to FIGS. 55 to 58 takes place.

A further modification which is not illustrated in the drawing, may consist, for example, in that an inherently resilient element is provided in a passage in the housing lid 903, wherein this passage is so designed that on pulling the slider member the element emerges from the passage with its front end, to which a retentive element is attached, and engages with the uppermost sheet of the pile, whereas this front end disappears into the passage when the slider member is re-inserted.

Figure 61:
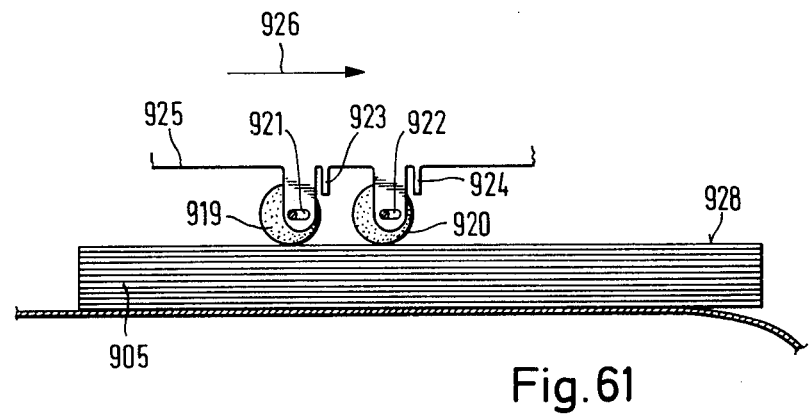
Figure 62:
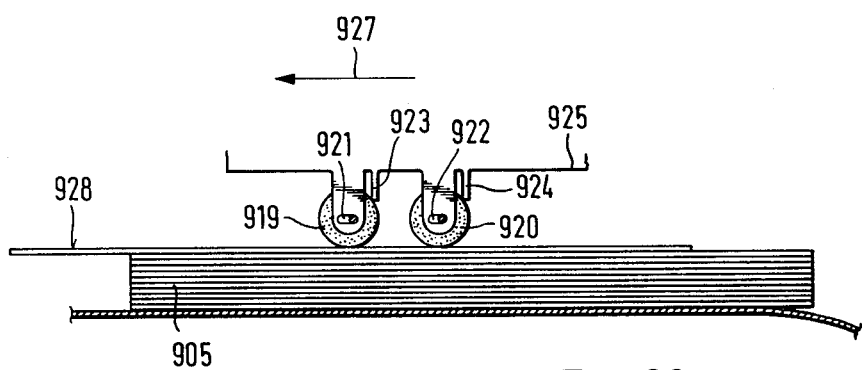

FIGS. 61 and 62 show a schematic partial view of an embodiment in which the uppermost sheet of a pile is carried along by two roller-shaped retentive elements 919 and 920. The axles of the rollers 919 and 920 are mounted in slots 921 and 922 and on one side of each roller there is provided a brake 923 and 924 fixed to the part denoted generally by the reference 925, on which also the rollers are mounted.

When the rollers are moved by the element 925 in the direction of the arrow 926, in which operation they are intended only to roll on the pile 905, their axles which are freely movable in the slots 921 and 922 are displaced as far as the ends of the slots furthest away from the brakes 924 and 923, so that the rollers are not impeded by the brakes. However, the axles of the rollers 919 and 920 are displaced in the slots 921 and 922 until the circumferential faces of the rollers come into contact with the brakes 923 and 924 when the part 925 is moved in the opposite direction, indicated by the arrow 927. As a result the rollers are unable to turn and carry with them the uppermost sheet 928 of the pile 905.

Of course, it is also possible to use only one free-running arrangement of this kind, that is to say, only one roller 919 with one brake 923; the use of two such free-running rollers is provided here merely to increase the certainty of the uppermost sheet in each case being gripped and transported. The free-running rollers acting from above on the pile of sheets 905 are, of course, pressed resiliently onto the pile of sheets.

FIGS. 63 to 66 show an embodiment in which likewise a free-running roller 929 acting from above on the pile of sheets 905 is provided, this roller consisting of a retentive material, for example rubber, and of which the axle 930 may be so displaced in a slot 931 that the roller 929, when it is intended to take with it a sheet from the pile 905, runs against a brake 932, whilst in the other direction of displacement, in which it is not intended to convey a sheet, it is not impeded by the brake 932 and rolls over the pile of sheets. The slot 931 is located in a part 933 which is pivotable about an axle 934, whereby the roller 929 can be moved out of its recess 935 into contact with the uppermost sheet of the pile 905, or can be moved into this recess and out of engagement with the pile. For this purpose, on the part 933 or on the rear end of the brake 932 firmly joined thereto, there is provided a projection 936 which engages in a slot 937 running at an angle to the axis of an adjusting wheel 938 in which the slot 937 is situated.

This opportunity for adjustment is provided so that the pile 905 may be completely removed, and this can be effected by pulling a drawer 939 out of the housing 940. If, before the drawer 939 is pulled out, the roller 929 is not brought out of engagement with the pile of sheets, then the uppermost sheet would remain in the housing when the drawer 939 is pulled out. To remove the pile of sheets an aperture 941 is provided in the bottom of the drawer 939, through which aperture a finger may be pushed to lift up the pile of sheets. Instead of this aperture or in addition thereto, lateral recesses 942 lying opposite one another could be provided in the side walls and in the bottom of the drawer (see FIG. 63), through which recesses the pile of sheets 905 can be gripped at the sides between thumb and index finger and lifted out.

Figure 68:
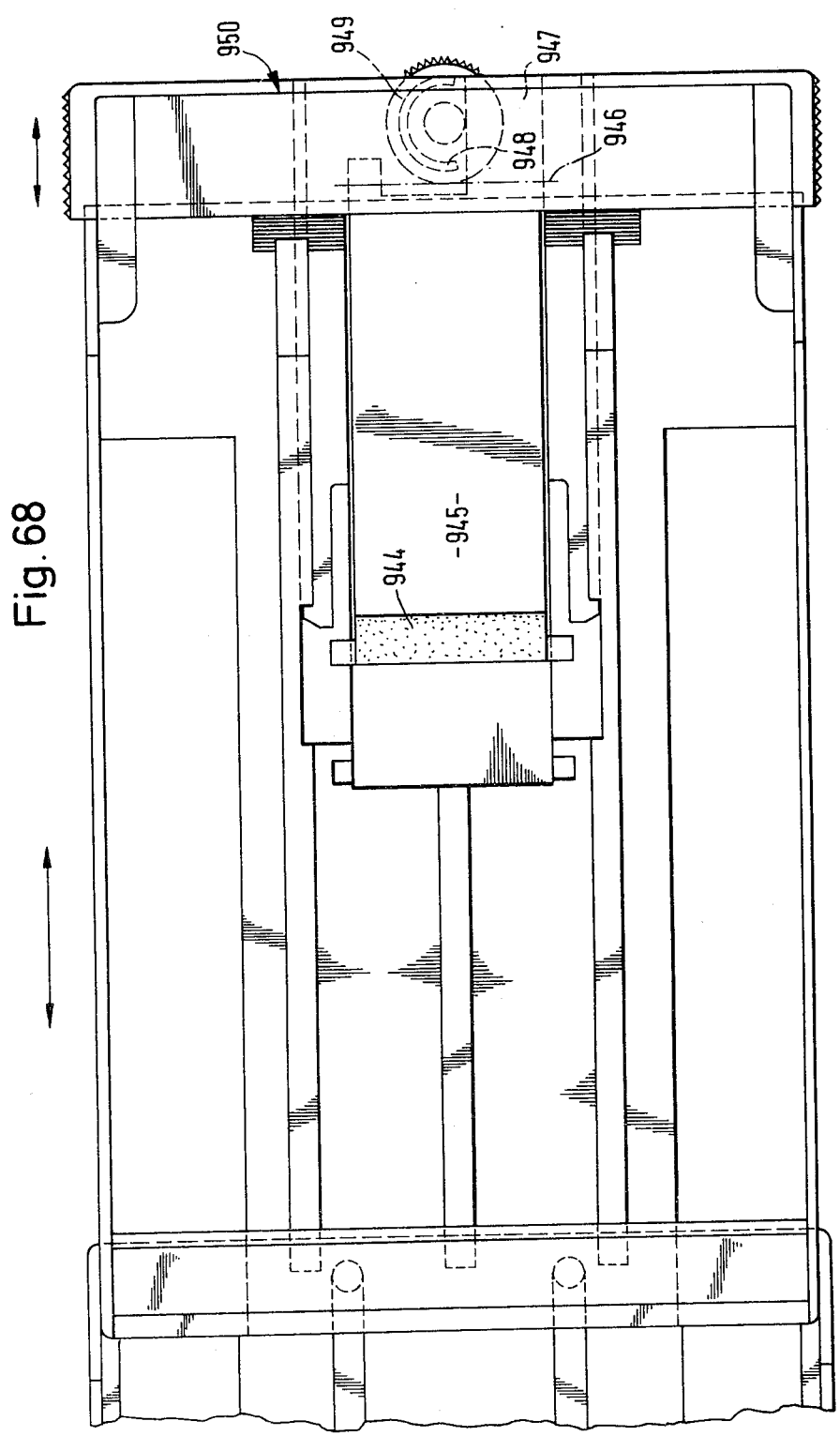
Figure 96:
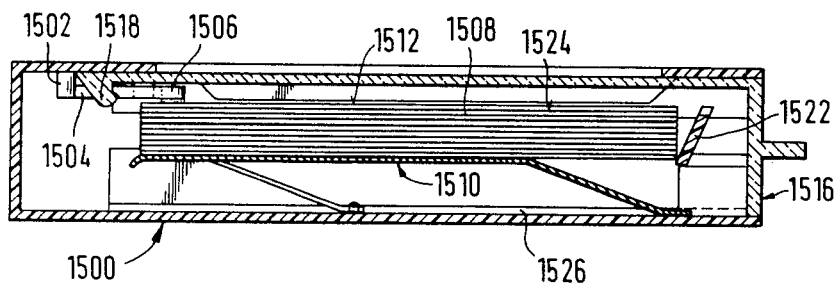
Figure 97:
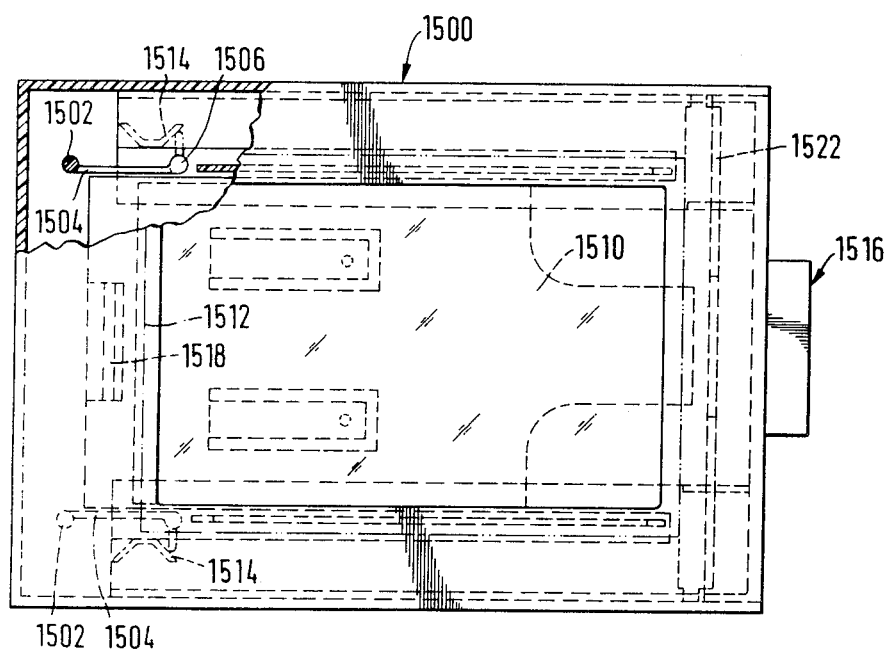

Finally, FIGS. 67 to 70 show a modified embodiment of the device shown in FIG. 45 with which the pile of sheets can be completely removed; FIGS. 67 and 68 show views of this example of an embodiment from below, the slider member for changing the picture and the drawer for completely removing the pile being in their inserted state in FIG. 67, whereas these two elements are shown in their pulled-out state in FIG. 68. FIGS. 69 and 70 show longitudinal sections. Details are given below only of modifications with respect to the embodiment shown in FIG. 45.

To remove the complete pile of sheets 905 from the slider member 943, an additional retentive element 944 is provided on a lever 945 that is pivotable about an axle 946. On the end 947 of the lever 945 that is located on the side of the axle 946 opposite the retentive element 944, there acts a wedge-shaped projection 948 of an adjusting wheel 949, so that depending on the angular position of the adjusting wheel 949 the retentive element 944 remains either in a recess in the bottom of the slider member and the drawer, this position being shown in FIG. 70 in solid lines, or the retentive element 944 is pushed so strongly against the underside of the pile of sheets 905 that it exerts a stronger retentive force than that exerted by the retentive lugs 715. This latter position is indicated by dot-dash lines in FIG. 70, and in this position the retentive element 944 takes with it also the lowermost sheet of the pile so that this does not, as shown in FIG. 69, remain behind in the housing. Alternatively, in this embodiment the drawer 950 which forms the front part of the slider member and can be pulled a little way out of the slider member in the direction in which the slider member is pulled out, as clearly seen in FIG. 68, may be provided with lateral recesses which correspond to the recesses 942 in FIG. 63.

Finally, it should be mentioned that the roller 929 of the embodiment shown in FIGS. 63 and 66 can also be made considerably smaller if, instead of the blade-shaped brake 932, a cup-shaped brake surrounding the roller 920 in cross-section like a half moon is selected, as a result of which a corresponding reduction in the overall depth of the device can be made. FIGS. 71–76 illustrate a first embodiment wherein the picture to be exchanged is lifted from the stack or pile of pictures in a direction substantially perpendicular with respect to the picture. In the housing 1000 slider 1002 is slidably reciprocable. The slider carries the separator 1004 and in the housing there is a spring bias assembly 1006. A control button 1008 is slidably movable in housing bottom 1010, and button 1008 engages over a free leg 1012 of the bias spring assembly such that in the initial position (FIG. 71 and FIG. 76, upper part) the spring bias assembly urges the picture stack 1014 upwards against viewing window 1016 of the housing 1000, however, the spring bias assembly is pulled downwardly clear of the stack when button 1008 is shifted to the right (in FIGS. 71–73). During this clearing, a surface adhesive coating 1018 disposed about centrally on the bias assembly side which faces the stack, will take the picture 1020 downwardly with it. The lateral portions of this picture, however, will abut ribs 1022 extending upwards from housing bottom 1010 so that the picture will assume a downwards bulged profile. (FIG. 75). The lowermost central portion of the picture is now confronting stop blocks 1024 on housing 1000. These stop blocks have upper faces which are beneath ribs 1022 but higher than the surface-adhesive coating. Button 1008 have diagonally extending push rods 1026 adopted to elastically yield inwards. In the initial position (FIG. 76, upper part), these push rods may be engaged by push hooks 1028 integral with the slider. Upon outward pulling of the slider button 1008 is first shifted to the right by hooks 1028. Soon, however, the push rods will meet ribs 1022 on housing 1000, and are flexed inwards so as to disengage from the push hooks. Only at this phase, separator 1004 will engage the stack from which the lowermost picture has been bulged downwards, and this picture cannot be moved by the separator for its front edge abuts blocks 1024. During movement of the separator, horn-like extensions 1030 of the separator will push the picture further downwards but will not convey it. Upon the return stroke of the slider, these extensions 1030 will engage under the edge of the picture retained in housing 1000 (FIG. 72), lift it from surface-adhesive coating 1018 and make it slip over the separator into the stack. A resetting web 1032 on the slider will finally engage button 1008 and push it back into its initial position. Protuberances 1034, 1036 adjacents rear wall 1035 of housing 1000 serve as stack alignment stops, and so do protuberances 1038 at slider front wall 1040.

FIGS. 71–81 relate to an embodiment similar in operation to the preceding one.

In housing 1100, slider 1102 is slidingly reciprocable between its inner end position FIG. 79) and its outer end position (FIG. 80). The section shape of the device may be recognized in FIGS. 77 and 78, it is slightly lense-shaped. In housing 1100, a set/reset spring (so-called "frog spring") 1104 is clamped in grooves 1106 of housing 1100. Because its lateral webs 1108 are biased inwards, its pressure plate 1110 is biased ("reset") upwards (FIGS. 77 and 79) or biased ("set") downwards (FIGS. 78, 80, 81). Upon switching from the reset position into the set position, pressure plate 1110 is biased ("reset") upwards (FIGS. 77 and 79) or biased ("set") downwards (FIGS. 78, 80, 81). Upon switching from the reset position into the set position, pressure plate 1110 will take with it the adjacent lowermost picture 1112 due to its being held by adhesive coatings 1114. The latter are disposed bilaterally of the picture centre and therefore the picture will adapt itself to the downwards bulged pressure plate profile. As in the previous embodiment of (FIGS. 71–76), one may provide stop blocks for the picture front edge for safety reasons; such blocks, however, are not shown and as well the protuberances in the housing to align the stack and their passage slots in the separator are not illustrated either. The reader may be referred to the preceding figures.

The separator bar 1116 is connected via lateral rods 1118 with front wall 1120 of slider 1102, and this wall is further connected to bottom parts 1122 and lateral guide parts 1124. The lateral webs 1108 of the spring 1104 extend between the guide points -124 and rods 1118.

It is to be noted that the plate 1110 is held stable in either of its set or reset positions but that already a slight pressure upon the plate upper side will suffice to switch it into its set status, and that inversely, a slight pressure from the bottom will switch back or reset the spring. This pressure is exerted by the slider. Upon pulling the slider out, its separator bar 1116 will urge upon the rear chamfered edges 1126 of the pressure plate 1110 and will than pass thereacross with a relatively wise clearance and the remaining stack 1128 being conveyed outwards thereby. Only in the central position, a horn 1130 will depend from the separator bar and engage, upon the slider return stroke, under the front edge of picture 1112, lifting the latter to permit it to slip over the separator. During this phase, spring 1104 still assumes its set position (FIG. 81). When the control wedges 1132 on front wall 1120 engage under pressure plate 1110, the latter is switched back or reset. The horn 1130 is unable to do this even if considerable tolerances are considered because it will engage the chamfered edge face 1134 of pressure plate 1110 so to always push the latter downwards.

In the drawings, the bulging of housing, slider, spring and pictures is exaggerated in order to clarify the illustration; in practice the pictures will be only slightly bulged but this will suffice to make the device operate as described.

FIGS. 82–86 show an embodiment wherein the surface retentive element although serving as the single picture conveyor, will also perform the function of the removal of said one picture from the stack in another phase of the slider movement.

In housing 1200, slider 1202 is slidably reciprocable. Its inner end position is shown in FIG. 83 and its outer end position in FIG. 84. At the bottom of housing 1200 a spring bias assembly 1206 is fixed at 1204. The pressure plate of the assembly designated 1208 carries adjacent its inner end a cylinder segment 1210 rotatable between two angular positions about an axis 1212. Axis 1212 extends perpendicular to the slider movement and parallel to viewing window 1214.

FIG. 82 shows the slider during its return stroke almost driven home. The cylinder segment which extends upwards beyond the pressure plate 1208, is provided with a surface adhesive coating and assumes its end position in clockwise sense. Upon engagement with the leading edge of the lowermost picture 1216, segment 1210 will be rotated counterclockwise, and segment 1210 will bend the edge of the picture downwardly. In the inner end position, consequently, a rather wide gap 1220 will be created between the picture and the remaining stack 1218 (FIG. 83) so that the separator 1222 mounted on the slider may readily convey the stack. Since the segment extends across but a portion of the entire width of the housing and of the pressure plate, the separator bar may be provided with a large indentation where it passes over the cylinder segment. Picture 1216 is, however, retained by the adhesive cylinder segment coating (FIG. 84) which is rotated in clockwise direction upon pulling of the slider so as to assume the position shown in FIG. 82. As far as here and in the following the term "surface adhesive" has been used, this term is meant to define the function of the respective member because a glue (assuming it would not be consumed and have a theoretically infinite life time) would at least leave traces on the pictures. Other means adapted to develop a strong adhesive force are suitable. For example, the "surface-adhesive element" could be provided with microscopically small elastic hooks and the pictures with cooperative microscopic loops, such means are sometimes referred to as "burdock" connectors. The loop surface will be inert with respect to the viewing face of the pictures and thus will not interfere with the picture removal. Another means would be to provide the pictures with a strip of magnetizable material or to glue such a strip onto them, these strips cooperating with a permanent magnet form the adhesive element in the device. In such embodiments, the magnet can become effective already prior to actual contact with the picture. Such an embodiment is illustrated in FIGS. 87, 88 and 89 which show different phases of the picture exchange and thus of the slider movement.

Housing 1300, slider 1302, spring bias assembly 1304, viewing window 1306 and separator 1308 will be recognized. The functions of these elements are similar to the preceding embodiments. The cover wall 1310 of the housing has inwardly protruding ribs 1312 with rounded ends and disposed lateral of the window; these ribs serve to push the stack 1314 downwards.

Beyond the ribs at the inner end of the housing, a permanent magnet 1316 is mounted on the inner side of the cover wall 1310. The magnet is made of highly coercive material.

The pictures are provided with a strip of magnetizable material adjacent their innermost edge (or at both their edges in order to be independent when inserting the pictures into the device). These strips are at the picture face opposite the magnet. These edges lie in front of the magnet 1316 which is dimensioned such that it is able to attract the edge of the adjacent picture but unable to attract that of the next following one. Thus, the separator may pass between said uppermost picture and the remaining stack, and upon the return stroke of the slider, the edge remote from the magnet will engage under the separator which finally will disengage the magnetized edge from the magnet. The next following picture will now be attracted by the magnet and the exchange operation may be repeated at will.

In the embodiment of FIGS. 90–95 the single picture conveyor is provided at the slider 1402 while the housing 1400 is provided with the stack conveyor 1404, being again a separator bar. A spring biased pressure assembly 1406 is fixed at the housing bottom at 1408.

The single picture conveyor is designed as a hook member 1410 mounted pivotably about an axle 1412 in slider 1402. Its pivot motion is controlled by means of a cam pin 1414 extending, with clearance, through an opening in slider side wall 1416 outwards into a cam groove 1418 sunk into the adjacent housing side wall 1420.

With the slider fully driven home, the tip 1422 of the hook member is somewhat spaced from the trailing edge of the uppermost picture 1424 but an adhesive element 1426 is pressed onto said picture.

In this position, the engaging edge 1428 of the tip 1422 is increment upwardly spaced from the uppermost picture. For the first of outward leading slider movement, said uppermost picture is pushed forward by the adhesive element, and this is readily possible because the leading edge of the picture is still in front of the separator bar 1404. Thereafter, cam pin 1414 is guided upwards in cam groove 1418 so as to pivot the hook member 1410 such that its tip urges downwards on the stack 1430 while the adhesive element clears off the uppermost picture. With further slider movement, tip 1422 will engage the trailing edge of the uppermost picture (FIG. 94) and pushes it through the separator slot. It will be noted that during this phase, tip edge 1428 is higher than the rounded face 1432 of the tip which faces the stack so that the next following picture will not be damaged, neither upon pulling of the slider nor upon its return stroke.

FIGS. 96-101 illustrate an embodiment whose manner of operation may best be recognized in FIG. 98 (schematic):

Housing 1500 carries posts 1502 at which leaf springs 1504 are fixed. The free ends of the leaf springs carry plugs 1506 with an adhesive coating. These adhesive elements face the picture stack 1508, and the uppermost picture 1512 is engaged at each of its two inner corners with a respective adhesive coating. A pressure assembly 1510 urges the pictures up against the adhesive on plugs 1506. Upon inward flexing of the leaf springs, therefore, said uppermost picture is squeezed inward and thus bulged upward. Said flexing of the springs is effected by control cams 1514 on slider 1516. Further, the slider carries a single picture conveyor 1518 which is a solid horn or hook.

With the slider fully driven home (FIG. 96), the coated plugs 1506 are in their outermost rest position. Once the slider motion has been initiated (FIG. 99), cams 1514 push the plugs 1506 inward with simultaneous upward bulging of the uppermost picture. Horn 1518 penetrates into the gap 1520 beneath the picture and pushes the remaining stack downwards against the bias of the pressure assembly with its rounded downward pointing face. Upon further slider pulling, horn 1518 will convey the single picture 1512 across the stack conveyor 1522 to the outside. Stack conveyor 1522 is a separator bar having an indentation or recess permitting passage of horn 1518. Immediately after the horn engages the uppermost picture, control cams 1514 will release plugs 1506 which may flex back into their initial positions unobstructed by the next following picture 1524 because horn 1518 constantly pushes the stack downward. This continues during the slider return stroke, too, so that picture 1524 will be squeezed only during outward motion of the slider.

It is to be noted that horn 1518 does not have sharp edges so that the removed picture may easily fall onto the slider bottom once having passed the separator and may be pushed home under the stack. Further, in this embodiment, housing 1500 does not have a transparent cover plate but simply defines a window frame. A transparent plate is formed in the slider 1516. It must be further noted that the stack conveyor 1522 and the adhesive elements 1506 are both disposed stationarily in the housing, the single picture conveyor 1518 moves relative thereto.

A last embodiment is illustrated in FIGS. 102-105.

Housing 1600 is provided with a pressure plate assembly 1602 which may be disabled by means of a displaceable button 1604 under control of slider 1606 in the same manner as described above with reference to FIGS. 71-76. Slider 1606 carries the separator bar 1608 and stack alignment stops 1610 engaging stack 1612 adjacent its center. On the upper side of pressure plate 1614 an adhesive element 1620 is mounted adjacent the front corner of the pressure plate and adjacent the alignment stops 1610 and an outer housing side wall 1616, as a result, adhesive element 1620 will frictionally and thus retentively engage the lowermost picture 1618 of the stack 1612.

FIG. 102 shows the return stroke of the slider shortly before it is driven home. The control mechanism of the pressure plate assembly just has released the latter, i.e. enabled it so that the adhesive element 1620 holds picture 1618 at the point of engagement.

Upon further inward pushing of the slider 1606, therefore, picture 1618 is turned with respect to the remaining stack, its lateral edge 1622 engaging thereby the soft leaf spring 1624 which may yield and flex outward. Picture corner 1626 opposite to element 1620 is pushed under separator bar 1608 (FIG. 103). The lowermost picture is thus prepared to be exchanged.

Upon pulling of slider 1606 (FIG. 104) the separator bar 1608 may readily slip over picture 1618 and convey the remaining stack outward while the surface adhesive element still holds the lowermost picture. Since, however, upon pulling of the slider the pressure plate assembly will be disabled, with the slider fully pulled outward, picture 1618 lies loosely on internal ribs 1628 of the housing and is re-aligned with the stack under the action of leaf spring 1624 to permit the picture to slip onto the stack again (FIG. 105.)

What is claimed is:

1. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture on one end of the pile disposed at said one end of the compartment and adjacent the window, a picture-changing mechanism in the enclosure means and operatively connected with the frame and slider for transporting an individual picture from a first end of the pile and returning said individual picture to the second end of the pile in response to the relative obverse and reverse sliding movements of the frame and slider, and the picture changing mechanism including an individual picture transporting means and a pile transporting means, one of the transporting means being connected with the frame and movable therewith and the other of the transporting means being connected with the slider and movable therewith, the pile transporting means being disposed at one side of the compartment to engage one side of the pile of pictures, the individual picture transporting means having portions thereof disposed at one end of the compartment to engage said individual picture at the corresponding end of the pile and cooperating with the pile transporting means to change the picture at the window in response to such relative obverse and reverse sliding movements of the frame and slider, and said picture changing mechanism further including surface retentive means having picture surface engaging means spaced from a side of the compartment for engaging the face of the picture and the picture surface engaging means effecting a gripping relation with the face of the individual picture to effect relative movement between the individual picture and the pile, the surface retentive means being movable relative to the pile with the surface engaging means in engagement with the face of said individual picture opposite the pile in response to said relative movement between frame and slider whereby said individual picture is loosened from the pile.

2. The picture viewer according to claim 1 wherein said surface retentive means includes a surface retentive element being movable with the individual picture transporting means.

3. The picture viewer according to claim 2 wherein said individual picture transporting means includes said surface retentive means and said surface retentive element.

4. The picture viewer according to claim 1 wherein said transporting means produce relative movement between the individual picture and pile in a first direction generally parallel to the viewing window, and the individual picture transporting means produces movement of said surface retentive means in a second direction substantially the same as said first direction for loosening said one certain picture.

5. The picture viewer according to claim 4 wherein the portions of the individual picture transporting means at said one end of the compartment has only said surface retentive means to engage said one certain picture at the end of the compartment.

6. The picture viewer according to claim 4 wherein said portions of the individual picture transporting means at said one end of the compartment including a pressure plate confronting the end of the compartment and said surface retentive means including strips on said pressure plate and of a retentive material to frictionally engage such pictures in the pile.

7. The picture viewer according to claim 4 wherein said mutually attractive characteristics include a magnet and magnetizable material defining a low reluctance path for the magnetic field.

8. The picture viewer according to claim 4 and said portions of the individual picture transporting means incorporating having a picture face engaging shoe with adjacent smooth and retentive surface portions alternately engaging the surface of the individual picture during alternate relative obverse and reverse sliding movements between the frame and slider, and cam means effecting such alternate engagement by the smooth and retentive surfaces of the shoe.

9. The picture viewer according to claim 4 wherein the individual picture transporting means includes a hook adjacent one end of the compartment to transport the individual picture relative to the pile transporter.

10. The picture viewer according to claim 9 and including cam means rendering said surface retentive means inoperative upon completion of loosening of the individual picture, and also rendering the hook effective to engage the individual picture only after initial movement of the picture has been accomplished.

11. The picture viewer according to claim 1 wherein said transporting means produce relative movement between the individual picture and pile in a first direction generally parallel to the viewing window and said individual picture transporting means producing movement of said surface retentive means in a second direction transverse to said first direction for loosening said one certain picture.

12. The picture viewer according to claim 11 and said surface retentive means being disposed at opposite sides of the compartment to compress the edge portions of an individual picture and cause the individual picture to bulge and bow away from the pile.

13. The picture viewer according to claim 11 wherein the viewing window lies substantially in a plane and said second direction is transverse to said first direction and also perpendicular to the plane of the window.

14. The picture viewer according to claim 13 wherein said surface retentive means is disposed adjacent one side of the compartment to lift an edge portion of the individual picture.

15. The picture viewer according to claim 14 and a rotor on the enclosure with said surface retentive means on the cylindrical surface thereof and engaging the edge portion of the individual picture to lift the picture away from the pile.

16. The picture viewer according to claim 14 and including said pictures in the pile, each of the pictures in the pile and also the surface retentive means having magnetic components which are mutually attractive to draw the individual picture away from the pile.

17. The picture viewer according to claim 13 wherein the surface retentive means is disposed adjacent the central area of the compartment and exerts a pulling force on the individual picture to produce a bulging and bowing of the individual picture.

18. The picture viewer according to claim 17 and including stops adjacent the end of the compartment and engaging and bulged individual picture to release the picture from the surface retentive means.

19. The picture viewer according to claim 1 wherein said transporting means produce relative movement between the individual picture and pile in a first direction generally parallel to the viewing window and said individual picture transporting means producing movement of the surface retentive means in a second direction opposite to said first direction for loosening said one certain picture.

20. The picture viewer according to claim 11 wherein the viewing window lies substantially in a plane and the individual picture transporting means moves the surface retentive means in a second direction transverse to said first direction and generally parallel to said plane.

21. The picture viewer according to claim 9 wherein said surface retentive means is disposed adjacent one side of the compartment to rotate said individual picture relative to the pile.

22. The picture viewer according to claim 1 wherein said surface retentive means includes a picture engaging element of a material with a high coefficient of static friction with the material of such pictures.

23. The picture viewer according to claim 22 and said individual picture transporting means including a lip tiltable in the enclosure means and carrying the surface retentive means and spring pressed into engagement with the pile of pictures.

24. The picture viewer according to claim 23 and including a friction element with surface retentive means, a mounting lever for said friction element and an adjusting wheel varying the rotational position of the lever for varying the retentive force applied by the friction element against the force of the picture.

25. The picture viewer according to claim 1 wherein the surface retentive means includes a substantially smooth surface with a coating of retentive material thereon.

26. The picture viewer according to claim 1 wherein the surface retentive means has a directional characteristic with a differential in the retentive effect between the movement produced during relative obverse sliding movement between frame and slider as compared to relative reverse sliding movement between frame and slider.

27. The picture viewer according to claim 1 and including a plurality of pictures in a pile in the compartment, the surface retentive means and each of said pictures having a mutually attractive characteristic.

28. The picture viewer according to claim 1 wherein the individual picture transporting means including pressure means on the enclosure means and confronting the window at the compartment to press the pile of pictures against the viewing window, the surface retentive means being carried on the pressure means in confronting relation with the compartment to confront and engage the individual picture at the end of the pile.

29. The picture viewer according to claim 1 and the picture changing mechanism including disabling means on the enclosure means and having connection with said individual picture transporting means to withdraw the surface retentive means endwise away from the compartment to draw the surface retentive means out of engagement with the individual picture at the end of the pile.

30. The picture viewer according to claim 29 wherein the viewing window is disposed at one end of the compartment and the surface retentive means is disposed at the other end of the compartment, and additional supporting bars in the enclosure means and adjacent the compartment to support the pile of pictures in the compartment upon withdrawl of the surface retentive means from the compartment.

31. The picture viewer according to claim 30 and the frame and slider having camming guides with connection to said surface retentive means and withdrawing the surface retentive means away from the window in response to relative reverse sliding movement between the frame and slider.

32. The picture viewer according to claim 1 and a disabling control on the enclosure means and projecting to the exterior thereof and having connection with the surface retentive means to withdraw said surface retentive means away from the compartment and out of engagement with the pictures in the compartment.

33. The picture viewer according to claim 1 and said surface retentive means having retentive and non-retentive effect, respectively, in response to relative obverse and reverse sliding movements between frame and slider.

34. The picture viewer according to claim 33 and means producing relief of pressure by the surface retentive means on the individual picture during relative reverse movement between frame and slider, and also inserting a spacer element between the surface retentive means and the picture during such relative reverse sliding movement.

35. The picture viewer according to claim 33 wherein the frame and slider are slidable in relative observe movement toward a picture changing position and are relatively slidable in reverse sliding movement toward rest position, said surface retentive means being mounted on the frame, and means withdrawing the individual picture and pile away from said surface retentive means at the rest position between frame and slider.

36. The picture viewer according to claim 33 and disabling means in the enclosure and having connection with said individual picture transporting means to alternately render the transporting means operative and inoperative, and including a manual control element at the exterior of the enclosure means for operating the disabling means.

37. The picture transporter according to claim 36, said portion of the individual picture transporting means being mounted on a lever at one end of the compartment and swingable toward and away from the pile of pictures in the compartment.

38. The picture viewer according to claim 33 and disabling means on the enclosure and operating in response to relative obverse and reverse sliding movements between frame and slider and having connection with said individual picture transporter to render the transporter operative and inoperative for removing an individual picture from the pile and said disabling means including control cams and followers on the frame and slider.

39. The picture viewer according to claim 38 wherein said portion of the individual picture transporting means being mounted on a lever at one end of the compartment and swingable toward and away from the compartment, and a spring biasing the lever toward the compartment for applying pressure to the pictures.

40. The picture viewer according to claim 33 wherein the individual picture transporting means includes a roller with a peripheral surface incorporating said surface retentive means, braking means connected with the roll and respectively braking and allowing free rotation of the roller in response to relative obverse and reverse sliding movement between the frame and slider.

41. The picture viewer according to claim 40 and said roller being mounted on an axis extending transversely of the direction of relative obverse and reverse sliding movement, means mounting said roller and having slots permitting relative movement of the roller in a direction parallel to the direction of relative obverse and reverse sliding movements, and a brake stationary with the mounting of the roller for alternately engaging and releasing the roller.

42. The picture viewer according to claim 40 and including a pair of such rollers substantially identically mounted in spaced and parallel relation with each other, each of the rollers having substantially brakes.

43. The picture viewer according to claim 33 and the individual picture transporting means including a roller at one end of the compartment and having braking means respectively applying and removing braking effect to the roller in response to respective relative obverse and reverse sliding movements between frame and slider, and additional means mounting the roller for pivoting the roller toward and away from the compartment, and an adjusting wheel controlling the pivoting of the mounting of the roller.

44. The picture viewer according to claim 43 wherein said adjusting wheel includes a cam and follower effecting swinging of the mounting of the roller.

45. The picture viewer according to claim 1 wherein the pile transporting means comprises a separator bar in substantially stationary relation with respect to the picture compartment and traversing said one side thereof, the picture compartment having an end wall cooperating with the separator bar to define a removal slot through which the individual picture is removed from the pile during picture changing, the individual picture transporting means including a transporter carriage movable through said removal slot and maintaining a freely mobile relation with respect to the separator bar during both relative obverse and reverse sliding movements between frame and slider.

46. The picture viewer according to claim 1 wherein the individual picture transporting means includes a two part construction, said parts being manually movable with respect to each other and connected with the surface retentive means for alternately rendering the surface retentive means operative and inoperative with respect to pictures in confronting relation therewith.

47. The picture viewer according to claim 46 wherein said surface retentive means comprises an elongate strip confronting the end of the compartment and adapted to be deformed by bowing to varying arcuate shapes to protrude into and withdraw from the compartment for respectively engaging and withdrawing from the face of the individual picture at the end of the pile.

48. The picture viewer according to claim 46 and a block and cam means moving the block in response to operation of the two part construction toward and away from the compartment for engaging and withdrawing from the individual picture at the end of the pile.

49. The picture viewer according to claim 1 wherein the slider defines the compartment, the pile transporting means being disposed on the slider for carrying the pile of pictures away from the window to facilitate removal of the pile of pictures from the enclosure.

50. The picture viewer according to claim 1 wherein said surface retentive means is of the glue-bonding type.

51. The picture viewer according to claim 1 wherein said surface retentive means incorporates a suction device for retentive purposes.

52. The picture viewer according to claim 51 wherein said pile transporting means includes a separator bar having indentations permitting passage of an extension disposed on a wall outside of the compartment through the separator bar into the compartment so to align the changed picture with the pile, and wherein a wall adjacent the compartment side opposite said separator bar pile alignment posts are provided overlapping said plate end which, with the slider being fully pulled, extends into the removal slot.

53. The picture viewer according to claim 1 wherein said surface retentive means includes a magnetically attractive component.

54. The picture viewer according to claim 1 wherein said surface retentive means has electrostatic properties to be electrostatically attractive of dissimilar charges.

55. The picture viewer according to claim 1 wherein said surface retentive means is of the burdock type.

56. The picture viewer according to claim 1 and including pictures in the compartment having pretreated faces of significant retentive characteristic and engageable with said surface retentive means.

57. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture on one end of the pile disposed at said one end of the compartment and adjacent the window, a picture changing mechanism in the enclosure means and operatively connected with the frame and slider for transporting an individual picture from a first end of the pile and returning said individual picture to the second end of the pile in response to the relative obverse and reverse sliding movements of the frame and slider, and the picture changing mechanism including an individual picture transporting means, a pile transporting means, and a surface retentive means, one of the transporting means being connected with the frame and movable therewith, and the other of the transporting means being connected with the slider and movable therewith, the pile transporting means being disposed at one side of the compartment to engage one side of the pile of pictures, the individual picture transporting means having portions thereof disposed at one end of the compartment to engage said individual picture at the corresponding end of the pile and cooperating with the pile transporting means to change the picture at the window in response to relative obverse and reverse sliding movements of the frame and slider, said surface retentive means having picture surface engaging means spaced from a side of the compartment for engaging the face of the picture and the picture surface engaging means effecting a gripping relation with the face of the individual picture to effect relative movement between the individual picture and the pile, the surface retentive means being movable relative to the pile with the surface engaging means in engagement with the face of an individual picture opposite the pile in response to said relative movement between frame and slider whereby said individual picture is loosened from the pile, and disabling means to render the retentive element disabled with respect to the remaining picture in the pile after said individual picture has been loosened and during substantially the remainder of the picture changing operation.

58. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture on one end of the pile disposed at said one end of the compartment and adjacent the window, a picture changing mechanism in the enclosure means and operatively connected with the frame and slider for transporting an individual picture from a first end of the pile and returning said individual picture to the second end of the pile in response to the relative obverse and reverse sliding movements of the frame and slider, the picture changing mechanism including an individual picture transporting means and a pile transporting means, one of the transporting means being connected with the frame and movable therewith and the other of the transporting means being connected with the slider and movable therewith, the pile transporter being disposed at one side of the compartment to engage one side of the pile of pictures, the individual picture transporting means having portions thereof disposed at one end of the compartment to engage said individual picture at the corresponding end of the pile and cooperating with the pile transporting means to change the picture at the window in response to such relative obverse and reverse sliding movements of the frame and slider, said portions of the individual picture transporting means including surface retentive means confronting the corresponding one end of the compartment and engaging a face of said individual picture to loosen it from the pile in response to said relative sliding movement between frame and slider, said retentive means including a retentive element connected with the frame and having means alternatively pressing said retentive element against the individual picture at the end of the pile during a picture changing operation and withdrawing said retentive element out of engagement with the individual picture at the end of the pile upon completion of the picture-changing operation, a disabling apparatus connected with said individual picture transporting means to render the same inoperative, operating means connected with said disabling means and operated in response to relative sliding movement between the frame and slider and also including a manual control for manually disabling the individual picture transporting means, said individual picture transporting means including a roller having an axle and mounting means including slots for the axle running substantially parallel to the direction of the sliding, and a brake for the roller to restrict rotation thereof to facilitate transport of an individual picture, the mounting means for the roller being tiltable against a spring which urges the roller against the individual picture during the transport of the individual picture relative to the pile.

59. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture on one end of the pile disposed at said one end of the compartment and adjacent the window a picture-changing mechanism adjacent the picture compartment for removing an individual picture from one end of the pile and returning the individual picture to the other end of the pile in response to such relative obverse and reverse sliding movements of the frame and slider to present a new picture at the window for display, said picture-changing mechanism including a pile transporter on the slider and movable therewith and also including an individual picture transporter on the frame and movable therewith, the pile transporter being disposed at one side of the compartment to engage one side of the pile of pictures, the picture transporter being disposed at one end of the compartment to engage such an individual picture at the corresponding end of the pile of pictures, the pile transporter producing movement of the pile of pictures with the slider and away from the viewing window during changing of the picture at the window, and the individual picture transporter producing relative movement of an individual picture relative to the pile of pictures during the changing of the picture at the window and a disabling means including a disabling control movably mounted on the enclosure means at the exterior thereof and transporter and thereby permit the pile transporter to transport the entire pile away from the window in response to such obverse sliding movement of the frame and slider, the picture compartment being on the slider and moving therewith away from the viewing window for providing access to the pile of pictures in the compartment.

60. The picture viewer according to claim 59 wherein said individual picture transporter includes pressure means on the enclosure means to press the pile of pictures against the viewing window, and said disabling means including a disabling control movably mounted on the enclosure means at the exterior thereof and having connection with said pressure means for relieving pressure on said pictures and rendering said individual picture transporter inoperative and allow the entire pile of pictures to move with the slider for removal from the viewer.

* * * * *